(12) United States Patent
Rusch

(10) Patent No.: US 11,612,247 B1
(45) Date of Patent: Mar. 28, 2023

(54) SHOP CHAIR

(71) Applicant: Christopher J. Rusch, Sturgeon Bay, WI (US)

(72) Inventor: Christopher J. Rusch, Sturgeon Bay, WI (US)

(*) Notice: Subject to any disclaimer, the term of this patent is extended or adjusted under 35 U.S.C. 154(b) by 0 days.

(21) Appl. No.: 17/334,024

(22) Filed: May 28, 2021

Related U.S. Application Data

(60) Provisional application No. 63/112,053, filed on Nov. 10, 2020.

(51) Int. Cl.
| | | |
|---|---|---|
| *F16M 11/00* | (2006.01) | |
| *A47C 7/00* | (2006.01) | |
| *A47C 3/24* | (2006.01) | |
| *F16M 11/22* | (2006.01) | |
| *F16M 11/20* | (2006.01) | |

(52) U.S. Cl.
CPC ............... *A47C 7/004* (2013.01); *A47C 3/24* (2013.01); *A47C 7/006* (2013.01); *F16M 11/20* (2013.01); *F16M 11/22* (2013.01); *F16M 2200/08* (2013.01)

(58) Field of Classification Search
CPC ........... A47C 3/24; A47C 7/004; A47C 7/006; F16M 11/20; F16M 11/22; F16M 2200/08
USPC ..................... 297/463.1, 463.2; 248/188.7
See application file for complete search history.

(56) References Cited

U.S. PATENT DOCUMENTS

| | | | |
|---|---|---|---|
| 595,450 A | 12/1897 | Archer | |
| 611,327 A | 9/1898 | Kelly | |
| 1,457,117 A * | 5/1923 | London | B25H 5/00 280/32.6 |
| 3,245,720 A | 4/1966 | Wenger | |
| 3,891,270 A | 6/1975 | Crossman | |
| 3,966,252 A * | 6/1976 | Albinson | A47C 3/24 297/411.39 |
| 4,087,071 A * | 5/1978 | Parker | A47C 3/24 248/406.1 |
| 4,113,221 A | 9/1978 | Wehner | |

(Continued)

FOREIGN PATENT DOCUMENTS

| | | | | |
|---|---|---|---|---|
| GB | 155125 A | * | 12/1920 | ............... A47C 3/24 |
| GB | 609243 A | * | 9/1948 | ............... A47C 3/24 |

OTHER PUBLICATIONS

Christopher J. Rusch Instagram photograph showing and discussing a preliminary shop chair design published Feb. 2020.

(Continued)

*Primary Examiner* — Rodney B White
(74) *Attorney, Agent, or Firm* — Jeffrey S. Sokol

(57) ABSTRACT

The present application relates to a shop chair with a seat cushion supported by a strong, light-weight base assembly with an elevated central hub that threadably receives a central column to adjust the height of the seat cushion. The base includes several vertically oriented thin plate legs that extend radially outward and downward from a central hub. The outer ends of the legs are joined by a stabilizing ring with a diameter larger than the seat cushion. Oversized caster wheels and the large footprint of the base provide a stable work platform. The seat cushion can be selectively lowered until the bottom of the central post is proximal to or contacts the ground. The chair and its base are particularly suited for work done closer to the ground.

22 Claims, 21 Drawing Sheets

(56) References Cited

U.S. PATENT DOCUMENTS

| | | | |
|---|---|---|---|
| 4,540,148 A * | 9/1985 | Jann | A47C 3/24 |
| | | | 188/67 |
| 4,572,573 A | 2/1986 | Yoshikawa | |
| 4,711,486 A | 12/1987 | Fujiyama | |
| 4,763,866 A * | 8/1988 | Sinchok | A47F 5/04 |
| | | | 248/188.7 |
| 4,828,212 A * | 5/1989 | Dicks | A47C 3/24 |
| | | | 248/406.2 |
| 5,149,035 A | 9/1992 | Bonnema | |
| 5,174,631 A | 12/1992 | Schaevitz | |
| 5,236,167 A * | 8/1993 | Tai | F16M 11/20 |
| | | | 248/188.7 |
| 5,288,045 A | 2/1994 | Edwards | |
| 5,439,269 A * | 8/1995 | Cheng | A47F 5/04 |
| | | | 248/188.7 X |
| 5,575,534 A | 11/1996 | Yu | |
| 5,927,810 A | 7/1999 | Liao | |
| 5,964,436 A | 10/1999 | Battey | |
| 5,985,188 A | 11/1999 | Jennings | |
| 6,149,239 A | 11/2000 | Markussen | |
| 6,234,434 B1 * | 5/2001 | Avinger | F16M 11/22 |
| | | | 248/188.7 |
| 6,517,043 B1 * | 2/2003 | Cahill | F16M 11/42 |
| | | | 248/188.7 |
| 7,410,211 B1 * | 8/2008 | Lin | A47C 4/24 |
| | | | 297/23 |
| 7,922,134 B2 | 4/2011 | Gasser | |
| 9,498,066 B2 | 11/2016 | Christianson | |
| 9,578,969 B1 | 2/2017 | Su | |
| 9,642,465 B1 | 5/2017 | Park | |
| 10,143,308 B2 | 12/2018 | Walker | |
| 10,631,645 B2 | 4/2020 | Corcorran | |
| 10,736,419 B2 | 8/2020 | Koulizakis | |
| 10,925,403 B1 | 2/2021 | Su | |
| 2016/0128882 A1 * | 5/2016 | Tsukada | A61G 1/017 |
| | | | 297/463.1 X |

OTHER PUBLICATIONS

Badass Workbench, of Kearney, NE 68847, Instagram photographs showing knockoff shop chair published about Mar. 2021. https://www.instagram.com/p/CMtODtwDWv2/?igsh.

* cited by examiner

SHOP CHAIR

TECHNICAL FIELD OF THE INVENTION

The present invention relates to a shop chair suited for working closer to the ground with a seat cushion adjustably supported by a strong, light-weight base with a large footprint formed by a central post, an elevated central hub, vertically oriented thin plate legs, an outer stabilizing ring and oversized caster wheels.

BACKGROUND OF THE INVENTION

Chairs and stools come in a wide variety of shapes and sizes, and are used for a variety of home and workplace uses. Different chairs serve different functions and have a wide variety of structures and components. A small example of the types of chairs include recliners, folding chairs, high chairs, rocking chairs, massage chairs, wheelchairs, bar stools, office chairs, dentist chairs and shop chairs. Shop chairs are used in automotive repair shops, as well as manufacturing plants and construction sites. Shop chairs are designed for doing a wide variety of work. Some shop chairs are intended to remain stationary when in use. Other shop chairs are designed to allow the person to move around the floor in a seated position while working. The shop chair should be strong enough to support a wide variety of people and provide a stable work platform.

A problem with conventional shop chairs is that they do not allow a worker to move around in a stable seated position over many manufacturing or construction floor settings. Manufacturing and construction floors frequently have uneven or rough surfaces, seams and bumps, and are frequently covered with debris from ongoing work. The chairs will either stop suddenly or pitch forward when they encounter these anomalies, which cause the worker to jerk, and require him or her to put down what he or she is doing to remove the debris, or even pick up and move the chair. The lack of a stable work platform and these many interruptions reduce the productivity of the worker, reduce the quality of the work being performed and can even pose a safety risk.

Another problem with conventional shop chairs is they are unable to lower the seat cushion to a lower level for working closer to the ground. Many manufacturing and construction settings require work to be performed closer to the ground. This occurs at a construction site when work is done in an area with limited head room, such as in a crawl space or under piping ductwork, staircase, scaffolding or ceiling mounted equipment. This occurs in a manufacturing setting when working on larger pieces of equipment or components resting on a pallet or the floor, such as during welding, grinding, deburring and cleaning processes. The shop chair is simply too tall for the area or work being performed. Instead, the worker must bend over or kneel to do the required work, placing extra stress on the joints and back of the worker.

A further problem with conventional shop chairs is the limited range of the seat cushion height. The chair either provides no ability to adjust the height of the seat cushion, or the range of heights is limited. Again, the worker must bend over, kneel or stand to do the required work, placing extra stress on the joints and back of the worker, which leads to poorer quality work and work related injuries.

A still further problem with conventional shop chairs is that they are either too heavy or too weak. Chairs that are sufficiently strong include large amounts of metal and are quite heavy. Lighter weight chairs simply do not provide the rugged durability need for a manufacturing or construction setting. Providing a shop chair that is both strong and light weight is problematic.

A still further problem with conventional shop chairs is that they are expensive. Strong chairs require a large amount of expensive steel or other suitable metal. Although lighter weight material can be used, these materials are expensive. Many components forming the chair are also not readily manufactured from stock materials, and require special and expensive manufacturing processes.

The present invention is intended to solve these and other problems.

BRIEF DESCRIPTION OF THE INVENTION

The present invention pertains to a shop chair with a seat cushion supported by a strong, light-weight base assembly with an elevated central hub that threadably receives a central column to adjust the height of the seat cushion. The base includes several vertically oriented thin plate legs that extend radially outward and downward from a central hub. The outer ends of the legs are joined by a stabilizing ring with a diameter larger than the seat cushion. The oversized caster wheels and large footprint of the base provide a stable work platform. The seat cushion can be selectively lowered until the bottom of the central post is proximal to or contacts the ground. The chair and its base are particularly suited for work done closer to the ground.

An advantage of the present shop chair is its stability when a person is performing work and moving around while seated in the chair, even when rolling over rough or uneven ground and debris. The chair is stabile when a person is leaning forward to do a job, such as welding, grinding, deburring, cleaning, etc. The chair is also stable when moving around on a floor with bumps, rough patches of concrete or debris, such as scraps of wood or metal, nails, bolts, wire, pencils, chalk, etc. The large footprint of the chair base and its oversized four inch diameter wheels allow the chair to easily roll or move over bumps, rough concrete and smaller debris without tipping, jerking or stopping. The large footprint also keeps the chair from tipping when a person leans forward, sideward or rearward to give the person a greater degree of seated motion or mobility while working. The legs extend out beyond the perimeter of the seat cushion, and the stabilizing ring is over fifty percent larger than the seat cushion. The chair improves worker productivity and safety by providing a stable work platform on which to sit while working and moving around, even when working closer to the ground.

Another advantage of the present shop chair is its strength and light weight construction. The chair legs are formed from thin metal plates placed vertically on end. The thin plates robustly handle the vertical and torque loads generated by a person sitting on the chair. The plates have an open interior truss design to further reduce the weight of the chair. The legs have a solid frame with cross members between the inner openings to give the legs a truss like quality to handle the vertical and torque loads. The frame and cross members are integrally formed from a single ³⁄₁₆" or ¼" plate, and have a height-to-thickness ratio at its inner end of about 20 to 1. A strong, light weight tubular stabilizing ring is secured to the outer ends of the legs to interconnect the legs and provide lateral stability and strength. In addition to the strength provided by the robust design of the vertical plates and stabilizing ring, a set of interior brackets interconnect the inner ends of the plates to form an interlocking leg securement mechanism around the central hub.

A further advantage of the present shop chair is its range of seat cushion heights. Elevating the central hub via the downwardly extending legs and the oversized wheels allows the central post and seat cushion a nine (9) inch range of vertical adjustability. In the low profile embodiment, the seat cushion can be lowered to a height of about fifteen (15) inches when doing work closer to the ground or raised to an elevated height of about twenty-four (24) inches when doing work at a higher level.

A still further advantage of the present shop chair base is its comfort when sitting closer to the ground. The large diameter stabilizing ring provides a natural foot rest for the worker with his or her feet positioned out in front of his or her torso, and away from under the seat cushion. The larger diameter stabilizing ring provides a comfortable resting point for his or her feet when sitting closer to the ground in an up right or leaning forward position.

A still further advantage of the present shop chair base is its manufacturability. The components forming the chair are readily manufactured from stock materials. The thin plate truss legs are formed from common rolled plate stock using conventional laser cutting technology. When the legs include integral inner and outer brackets, the brackets are easily bent with conventional plate bending machinery. The stabilizing ring is formed from standard stock tubing with conventional tube bending machines. The central column and hub are formed with conventional lathe and drill press machinery. Thus, the strong, light weight shop chair of the present invention is efficiently and economically manufactured.

Other aspects and advantages of the invention will become apparent upon making reference to the specification, claims and drawings.

DESCRIPTION OF THE PREFERRED EMBODIMENT

Figure 1:
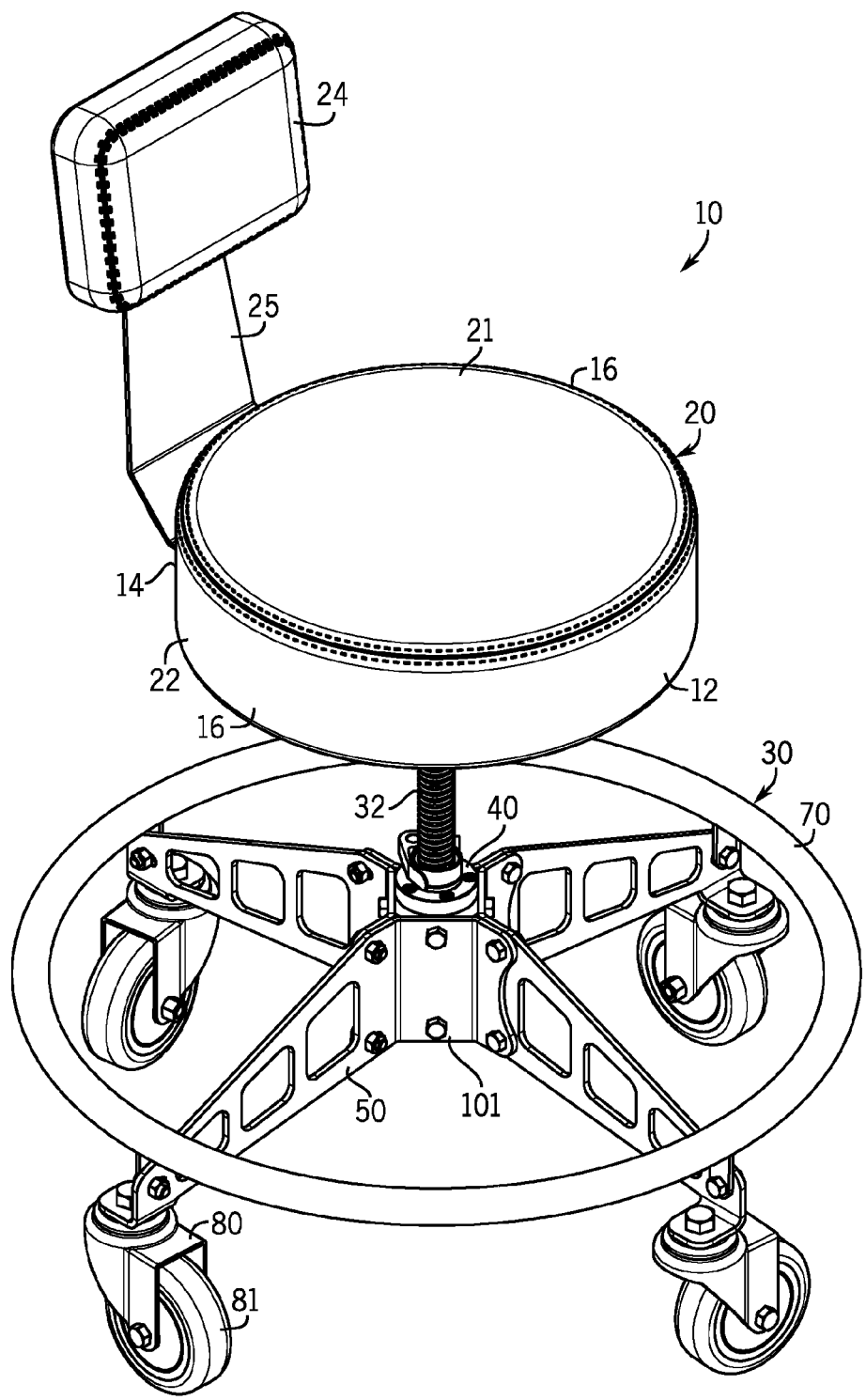
FIG. 1 is a perspective view of a first or four leg embodiment of the shop chair showing the large footprint of its base and four, thin plate, truss legs extending radially downward from an elevated central hub, an outer stabilizing ring secured to and over the outer end of each leg, and a cater wheel assembly secured to the outer end of each leg.
Figure 2:
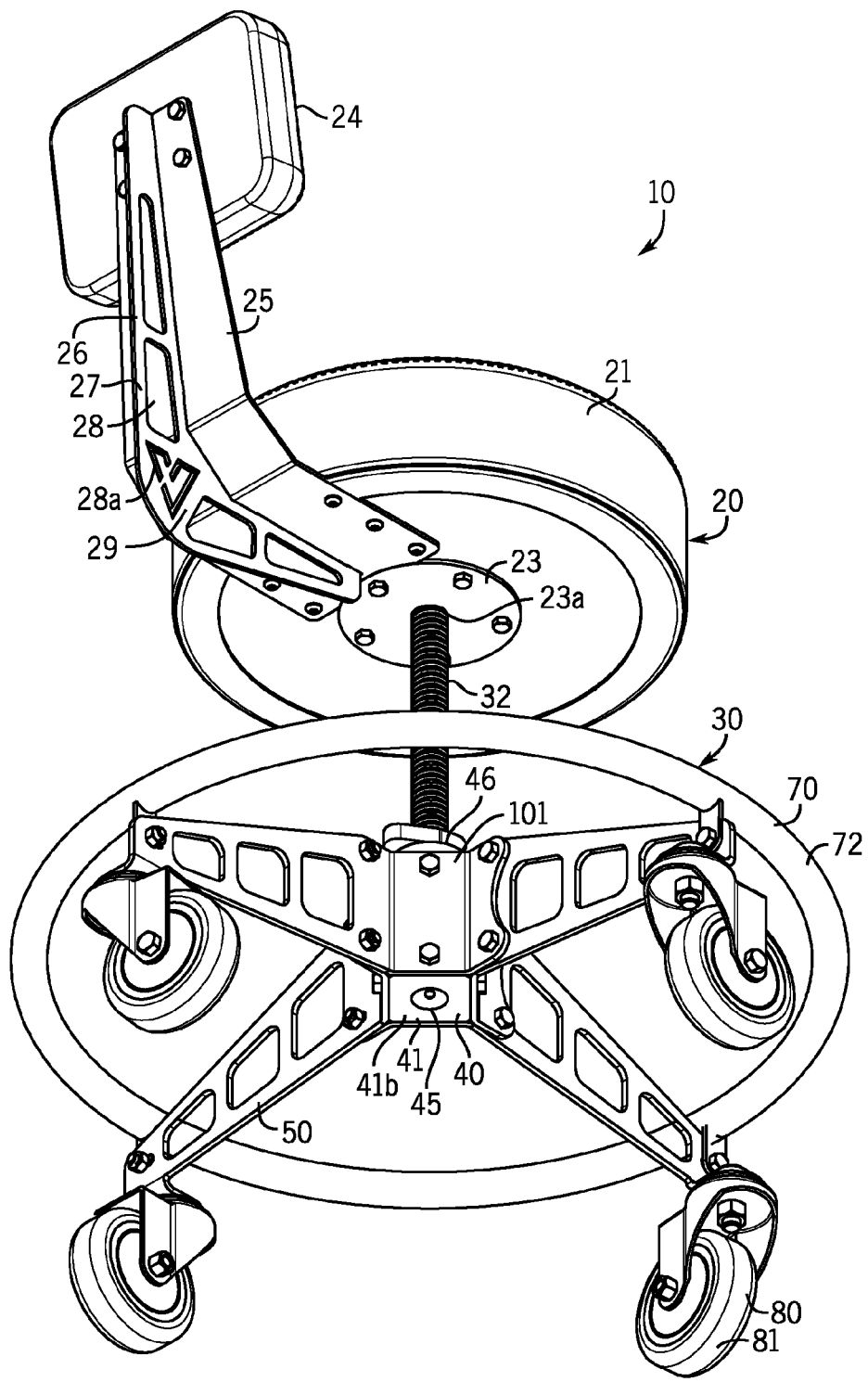
FIG. 2 is a lower perspective view of the first embodiment of the shop chair showing the chair base and securement of the seat back and central rod to the bottom of the seat cushion.

While this invention is susceptible of embodiments in many different forms, the drawings show and the specification describes in detail preferred embodiments of the invention. It should be understood that the drawings and specification are to be considered an exemplification of the principles of the invention. They are not intended to limit the broad aspects of the invention to the embodiments illustrated.

The present invention relates to a shop chair for working from a seated position. The seated occupant can move around the floor 5 of the work area in a stable manner when doing work closer to the floor 5 or doing work at a more elevated position. The shop chair is shown in FIGS. 1-21 and is generally referred to by reference number 10. The chair 10 is both strong and light weight. It supports up to 300 pounds, weighs as little as thirty-two (32) pounds and has a range of seat cushion heights of fifteen and twenty-four (15 to 24) inches from the floor. The chair 10 is well suited for working closer to the ground and in areas of limited height, such as working on equipment and components resting on a pallet or the ground, or HVAC ductwork or pipe runs in a crawl space. The chair provides stability when doing a wide variety of jobs, such as welding, grinding, deburring, cleaning, etc. The chair also provides stability when moving around in a seated position, particularly when the floor 5 has rough concrete patches, seams and transitions between surfaces, temporary lighting cords, or debris such as scraps of wood or metal, nails, bolts, pencils, chalk, etc, which can cause a chair to jerk or tip when the wheels engage them.

The chair can be fabricated into a variety of embodiments. A first embodiment or four wheeled steel design shown in FIGS. 1-5 has a weight of about thirty-two (32) pounds and a seat cushion height range between fifteen to twenty-four (15 to 24) inches. A second embodiment or elevated five wheeled steel design shown in FIGS. 6-8 has a weight of about thirty-six (36) pounds and a seat cushion height range between twenty-four and thirty-two (24 to 32) inches. A third embodiment or five wheeled aluminum design shown in FIGS. 9-13 has a weight of about thirty-two (32) pounds and a seat cushion height range between fifteen to twenty-four (15 to 24) inches. A fourth embodiment or five wheeled steel design shown in FIGS. 14-20 has a weight of about thirty-eight (38) pounds and a seat cushion height range between fifteen to twenty-four (15 to 24) inches. While the chair is shown and described as having these four embodiments, it should be understood that the chair can have a wide variety of embodiments without departing from the claimed invention.

The shop chair 10 includes a seat assembly 20 and a base assembly 30. The chair 10 has a central axis 10a, front 12, back 14 and opposed sides 16. The seat assembly 20 has a conventional seat 21 that is preferably a seat cushion with an internal cushion material and a wooden, metal or plastic base that are surrounded by a durable outer fabric layer. The horizontal seat 21 has an upper surface 21a and an outer lateral perimeter 22 that is preferably round. The seat 21 has a diameter Sd of about fourteen (14) inches, but which can be as large as eighteen (18) inches. When in its cushioned form, the seat cushion 21 has a thickness of about three (3) inches. The seat 21 has an adjustable seat height Ch with about a nine (9) inch range of seat heights. The center of the round seat 21 is aligned with the chair centerline 10a. While the seat or seat cushion 21 is shown to be round when viewed from above, it should be understood that the seat or seat cushion can have a wide variety of shapes without departing from the broad aspects of the invention.

A metal mounting plate 23 is rigidly secured the bottom surface of the seat cushion 21. The bottom plate 23 is generally flat with a thickness of about 10 gauge (0.134 inch) to 3/16 (0.175) inches, and has a circular perimeter to correspond to the shape of the seat cushion 21. The plate 23 has a central opening 23a. The upper surface of the plate 23 is placed flush against the bottom surface of the seat 21, and is firmly secured to the seat, such as by screw or bolt type fasteners 24. The bottom plate 23 can include a funnel shaped seat bell (not shown) for extra support. The seat bell is positioned around the central column 32. The two and a half (2½) inch wide upper end of the seat bell is welded or otherwise rigidly secured to the lower surface of the bottom plate 23, and the one (1) inch wide lower end of the seat bell is welded or otherwise rigidly secured to the outer surface of the central column 32. The center of the seat 21 and center of the mounting plate opening 23a are in linear alignment with the central axis 10a of the chair 10.

The seat assembly 20 includes an optional seat back 24 secured to the seat 21. The seat back 24 is secured to the seat 21 by an L-shaped mounting bracket 25. One end of the mounting bracket 25 is rigidly secured to the rear surface of the seat back 24, and the other end of the bracket is rigidly secured to the bottom surface of the seat 21, such as by wood screw type fasteners. The L-shaped bracket 25 has a vertically oriented thin plate stiffening web 26. The centrally located stiffening web 26 has a truss-like construction with a solid outer frame 27, inner openings 28 and intermediated cross members 29. The inner openings 28 can form a distinctive design, logo or the shape of a letter 28a, such as the letter "V" shown in FIGS. 2 and 3.

The base assembly 30 is strong to support the weight of a worker when sitting up straight or leaning forward, backward or sideward, and light weight to allow the worker to move about with relative ease. The base 30 also has a wide footprint to increase the stability of the chair 10. The base assembly 30 can be manufactured to have a compact or elevated configuration. The base assembly 30 is constructed in a range of configurations from a low profile configuration as in FIGS. 1-5 to an elevated configuration as in FIGS. 6-8.

The base assembly 30 includes a central column 32, a central hub 40, several radially extending thin plate legs 50, a stabilizing ring 70 and several oversized caster wheel assemblies 80. The central column or chair screw 32 has a central axis 32a, top end 33, bottom end 34 and threaded outer cylindrical surface 35. The top and bottom ends 33 and 34 are generally flat. The outer surface 35 is threaded or grooved to allow seat height Sh adjustments. The column 32 is rigidly secured to the seat cushion 21, and is perpendicular to the seat cushion. The top end 33 of the column 32 is received by the central opening 23a in the seat cushion plate 23, and welded or otherwise rigidly or firmly secured to the plate. The central column 32 is formed from a solid steel rod having a diameter of about one (1) inch, length of about twelve (12) inches and weight of about three (3) pounds.

The central hub 40 adjustably receives the central column 32 to securely set or position the seat 21 at a desired height Sh. The hub 40 has a central axis 40a, and a main body 41 with a flat top surface 41a, flat bottom surface 41b, vertical side surface or surfaces 43 and a central opening 45. When the legs 50 are secured to the hub 40 via brackets as discussed below, the hub preferably has a number of flat side surfaces 43 equal to the number of chair legs 50, with each leg extending from the outermost edge 44 formed by two adjoining side surfaces. The hub 40 has an effective radius from its central axis 40a of about one and a half (1.5) inches. The top 41a to bottom 41b length of the hub main body 41 is at least about two to three inches, and preferably about four (4) inches. The central opening 45 is colinear with the hub axis 40a and passes completely through the hub 40 from top 41a to bottom 41b. The opening 45 is parallel to its side surface 43 or edges 44. The hub 40 preferably has a recess 42 in its upper surface 41a to accommodate a replaceable screw nut 46. The recess 42 has a circular perimeter to receive the screw nut 46, which also has a circular perimeter. The hub 40 and screw nut 46 have a combined weight of about 1.7 pounds.

The screw nut 46 has a larger diameter upper portion 47 that extends beyond the round perimeter of the recess 42, and a narrower diameter lower portion 48 that snuggly nests in the recess. The upper portion 47 has a flat upper surface 47a and lower shoulder surface 47b. The lower portion 48 has a flat lower surface 48a. The flat shoulder surface 47b engages the flat upper surface 41a of the hub 40, and the flat lower surface 48a of the screw nut 46 engages the flat bottom surface of the recess 42. Screw type fasteners rigidly secure the screw nut 46 to the hub 40 so that the screw nut does not rotate clockwise or counterclockwise. The flat upper surface 47a of the screw nut 46 becomes the effective upper surface 41 of the hub 40.

The screw nut 46 has a threaded central opening 49 with a central axis 49a. The central opening 49 of the screw nut 46 has a diameter of about one (1) inch, and is threaded to adjustably receive the threaded outer surface 35 of the column 32. Should the threaded opening 49 of the screw nut 46 wear out, the screw nut is easily replaced. While the present embodiments shows the hub 40 with a screw nut 46 forming the threaded central opening 49, it should be understood that the screw nut can be eliminated and the hub 40 itself can form the threaded opening 49 without departing from the broad aspect of the invention. In addition, while the present embodiments show the central column 32 with a threaded outer cylindrical surface 35 and the hub 40 or screw nut 46 forming a threaded central opening 49, it should be understood that the central column 32 and central opening 45 or 49 do not have to be threaded provided they allow adjustments to the seat height Sh and securely support the weight of the person when the seat 21 is set at a desired height.

The chair axis 10a, column axis 32a and hub axes 40a and 49a are colinear. When the chair 10 is on a level, horizontal floor 5, these axes 10a, 32a, 40a and 49a extend vertically. Rotating the central column 32 in the threaded opening 49 causes the central column 32 to move linearly or vertically relative to the hub 40. Rotating the seat 21 and central column 32 in one direction (clockwise) lowers the seat height Sh, and rotating the seat 21 and central column 32 in the opposite direction (counter clockwise) raises the seat height Sh. When viewed from above, the side surface or surfaces 43 of the hub 40 can form one of a variety of shapes, such as a circle, square, pentagon, hexagon or octagon. The side surfaces 43 of the hub are parallel to its central axes 40a.

The chair 10 has a plurality of legs 50 extending radially outward from the central hub 40. The legs 50 are spaced uniformly around the circumference of the hub 40. Each leg 50 is formed from an integral plate of metal, such as a 3/16 inch or 1/4 inch plate of steel or 3/8 inch plate of aluminum. Each leg 50 has a top 51, a bottom 52, an inner end 53, an outer end 54. For the steal legs 50, the outer perimeter edges or ends 51-54 of the thin plate leg 50 and its interior openings 66 are preferably laser cut for manufacturing efficiency. For aluminum legs 50, the perimeter edges 51-54 and openings 66 are machine cut. Each leg 50 is stood vertically on end to support the elevated central hub 40. Together, the legs form a roof or pyramid truss-like configuration. The side surfaces 57 of the legs 50 face each other similar to the paddles of a paddlewheel. For the low profile chair 10 embodiments, each thin plate truss leg 50 has a height-to-thickness ratio of preferably between about 10 to 1 and 21 to 1 at its inner end 53, and preferably between about 5 to 1 and 10 to 1 at its outer end 54. Each thin plate truss leg 50 has a length-to-thickness ratio between about 28 to 1 and 56 to 1. Although the thin plate truss legs 50 are preferably 3/16, 1/4 or 3/8 inch thick with height-to-thickness and length-to-thickness ratios within the above preferable ranges, it should be understood that the broad aspects of the invention includes plate thickness between 3/16 and 1/2 inches, a height-to-thickness ratio between about 6 to 1 and 21 to 1 at its inner end 53 and between about 4 to 1 and 10 to 1 at its outer end 54, and a length-to-thickness ratio of between about 20 to 1 and 60 to 1 without departing from the broad aspects of the invention.

The inner and outer ends 53 and 54 of the legs 50 have securement tab 58 and 59. The inner securement tab 58 has a vertical height of about four (4) inches. The outer securement tab 59 has a vertical height of about two (2) inches. Each of the inner and outer securement tabs 58 and 59 has a width of about one and three-quarters (1.75) inches. Both securement tabs 58 and 59 span the height of the leg 50 at their respective locations. The inner securement tab 58 has two or three one-third (1/3) inch diameter mounting holes or slots 58a. The outer securement tab 59 has one or two one-half (1/2) inch diameter mounting holes or slots 59a. The solid inner and outer frame portions 63 and 64 are formed by a solid portion of the securement tabs 58 and 59. Each low profile steel leg 50 (FIGS. 1-5 and 14-20) has a weight of about 1.7 pounds. Each elevated steel leg 50 (FIGS. 6-8) has a weight of about 1.9 pounds. Each aluminum leg 50 (FIGS. 9-13) has a weight of about 0.6 pounds. While the present embodiments show the vertically oriented thin plate legs 50 with a frame 55 and weight reducing partially open interior 56 formed by beams or cords 61-65 and openings 66, it should be understood that the thin plate legs 50 can be solid throughout without departing from the broad aspect of the invention.

Each leg 50 has a solid frame 55 with a partially open interior 56. The frame portion 55 is formed by an upper cord 61, a lower cord 62, a vertical inner cord 63 and an outer cord 64. Each cord 61-64 has a width of at least about one half (1/2) inch. The upper and lower cords 61 and 62 are angled so that the inner vertical riser or cord 63 is longer than the outer member or cord 64. The inner cord 63 is formed by the outer portion of the inner securement tab 58. The outer cord 64 is formed by the inner portion of the outer securement tab 59. The frame 55 of each leg 50 is solid and free from openings. The partially open interior portion 56 has a plurality of intermediate members 65 and a plurality of openings 66 to give the leg a truss acting configuration. Similar to the vertically oriented stiffening web 26 of the seat back 24 discussed above, the openings 66 can form a distinctive design, logo or the shape of a letter. The intermediate members or cross members 65 are solid, spaced apart and join the upper and lower cords 61 and 62 to transfer load between the upper and lower cords. In the embodiment shown, the cross members 65 are located at about one third increments along the length of the leg 50. The number of cross members 65 and the size and shape of the openings 67 can vary, but the openings 66 do not extend into the frame 55 (cords 61-64) and cross members 65.

The inner vertical risers or cords 63 are rigidly secured to the vertical side surface or surfaces 43 of the hub 40. In the embodiments shown, the inner securement tab 58 and vertical riser 63 extend along one of the vertical side edges 44 of the hub 40. The inner securement tab 58 and vertical risers 63 span the length of the main body 41 of the hub 40. When the chair 10 has four legs 50, the hub 40 has four side surfaces 43 and four side edges 44, so that the legs 50 are spaced at ninety degree (90°) increments around the hub as in FIGS. 1-5. When the chair 10 has five legs 50, the hub 40 has five side surfaces 43 and five side edges 44, so that the legs 50 are spaced at seventy-two degree (72°) increments as in FIGS. 6-20. When the chair 10 has six legs 50, the legs 50 are spaced at sixty degree (60°) increments. Each thin plate leg 50 extends radially outward and downwardly from the elevated central hub 40. Each leg 50 extends radially outward from the surface 43 or edge 44 of the hub 40 a distance of about ten and a half (10.5) inches, so that the outer end 54 of the leg is about twelve (12) horizontal inches from the central axis 10a, 32a, 40a of the chair 10 and its base assembly 30. While the hub swide surface 43 and inner leg risers 63 are shown with a vertical orientation, it should be understood that the hub side surface and inner leg riser could be angled from vertical without departing from the broad aspects of the invention.

The amount of downward angle of the legs 50 varies for the different chair 10 embodiments. For the lower profile chair 10 embodiments shown in FIGS. 1-5 and 9-20, the upper cord 61 of each leg 50 angles or slopes downward at an angle of about twenty-two degrees (22°) from horizontal. The lower cord 62 angles or slopes downward at an angle of about eight degrees (8°) from horizontal. Because the upper cord 61 angles down at a greater degree than the lower cord 62, the cords are spaced further apart at the inner end 53 of the leg 50. The vertical inner riser cord 63 joins the upper and lower cords 61 and 62 proximal the inner leg end 53. The shorter outer cord member 64 joins the upper and lower cords 61 and 62 proximal the outer leg end 54. The inner securement tab 58 and riser 63 of each leg 50 are rigidly secured to the side surface 43 of the hub 40.

Figure 6:
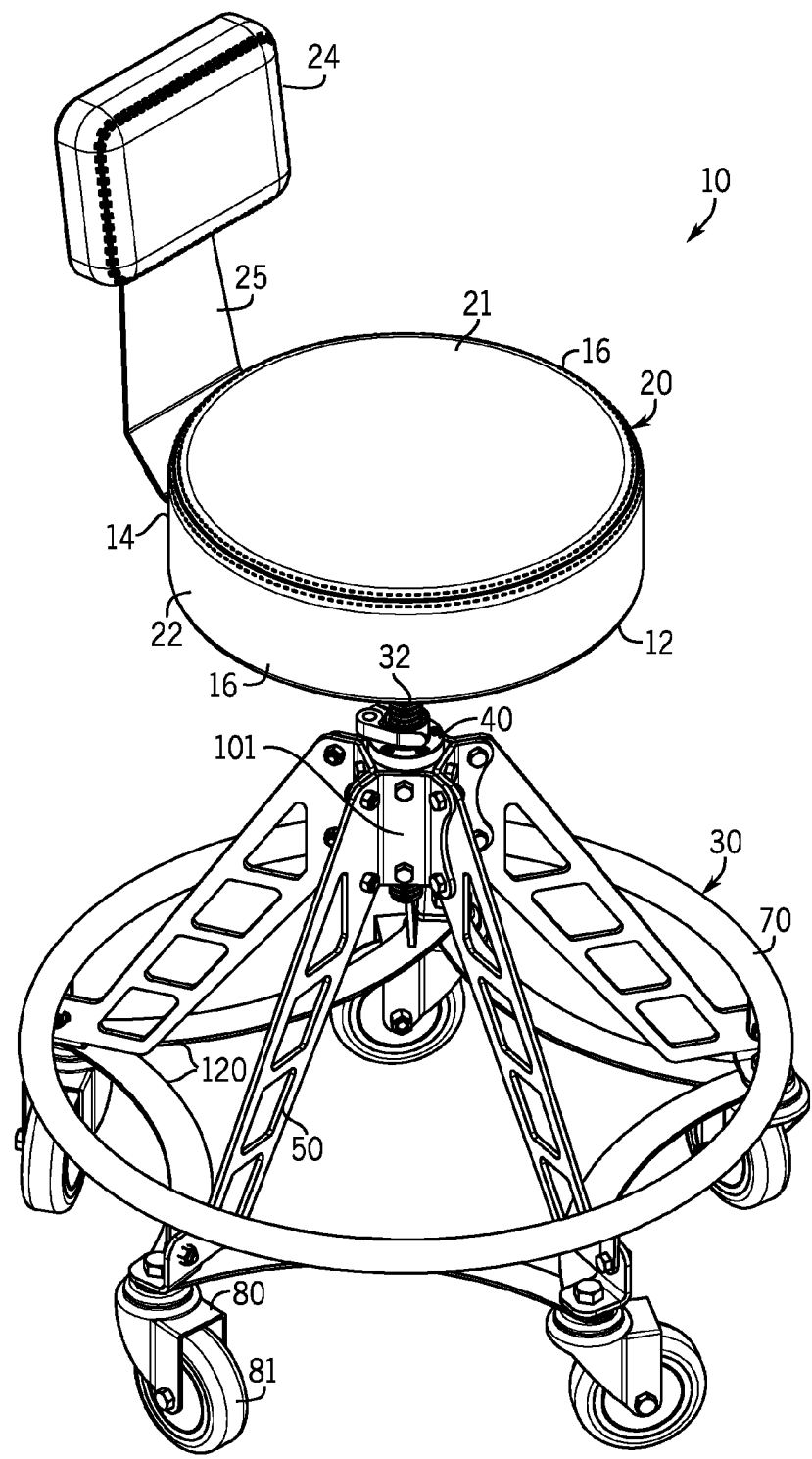
FIG. 6 is a perspective view of a second or elevated embodiment of the shop chair with five, more steeply inclined, truss legs, and showing the stabilizing ring used in conjunction with a second leg stabilizing structure positioned below the legs and ring.
Figure 7:
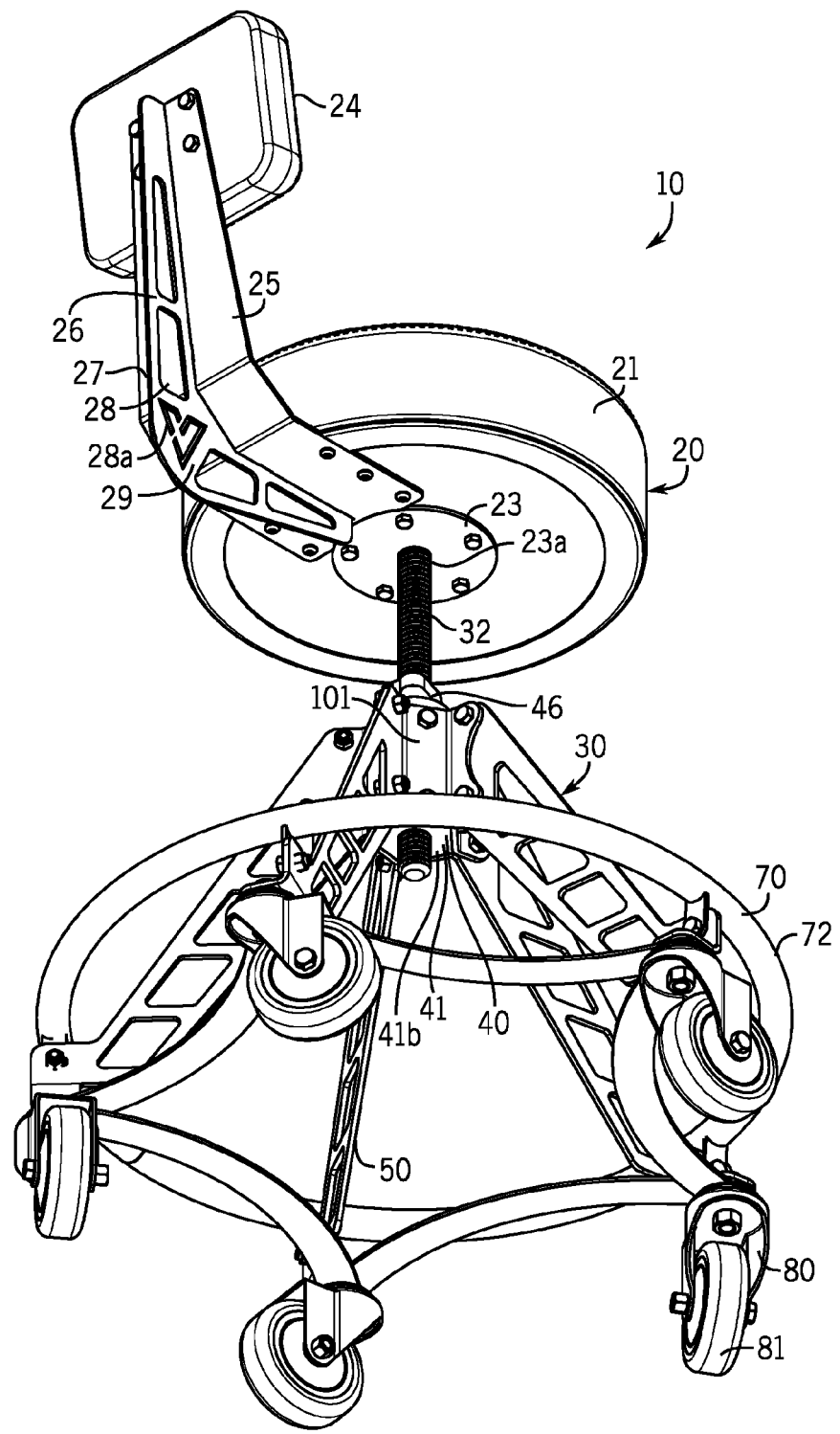
FIG. 7 is a lower perspective view of the second embodiment of the shop chair.
Figure 8:
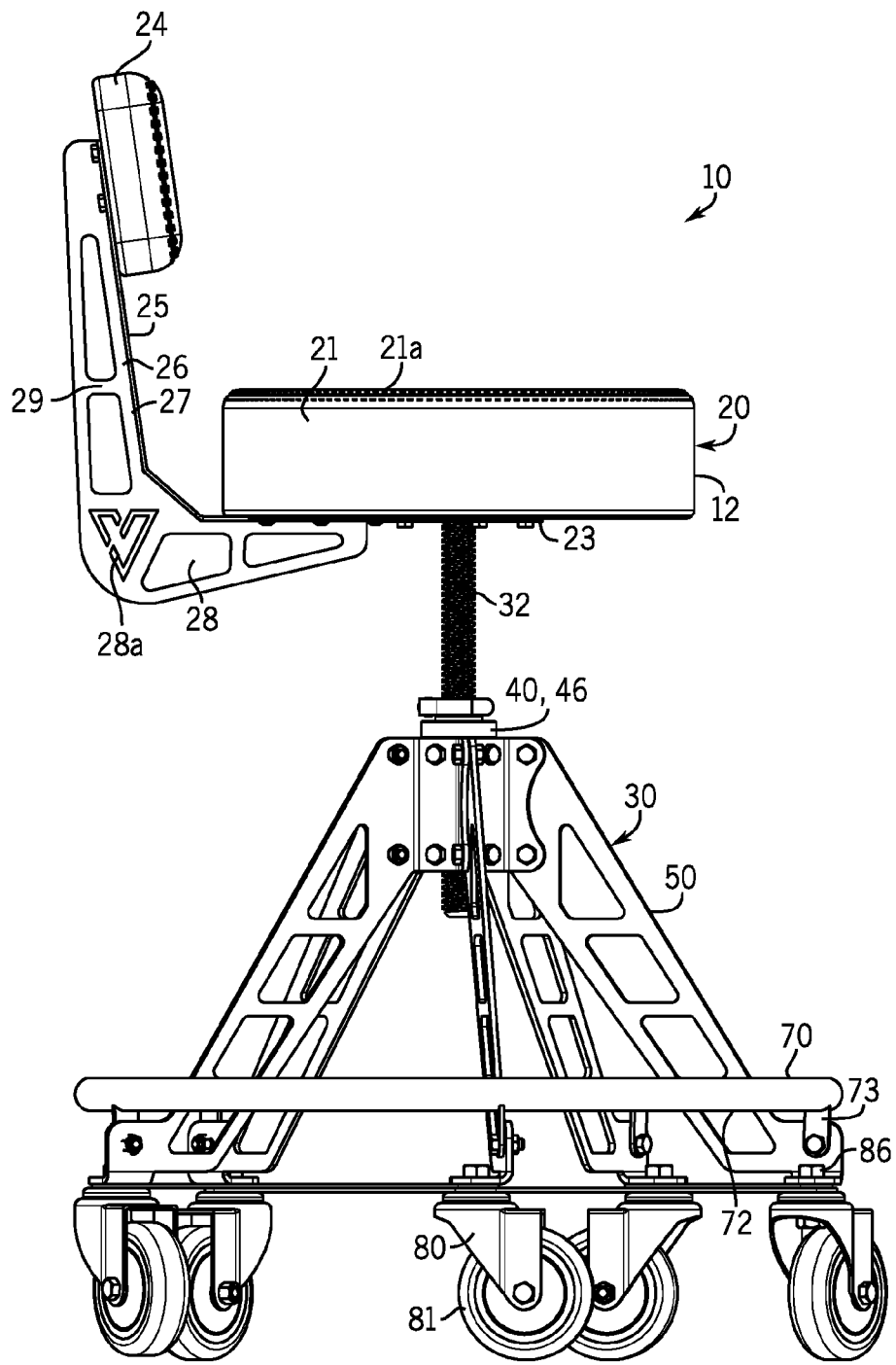
FIG. 8 is a side view of the second embodiment of the shop chair.
Figure 9:
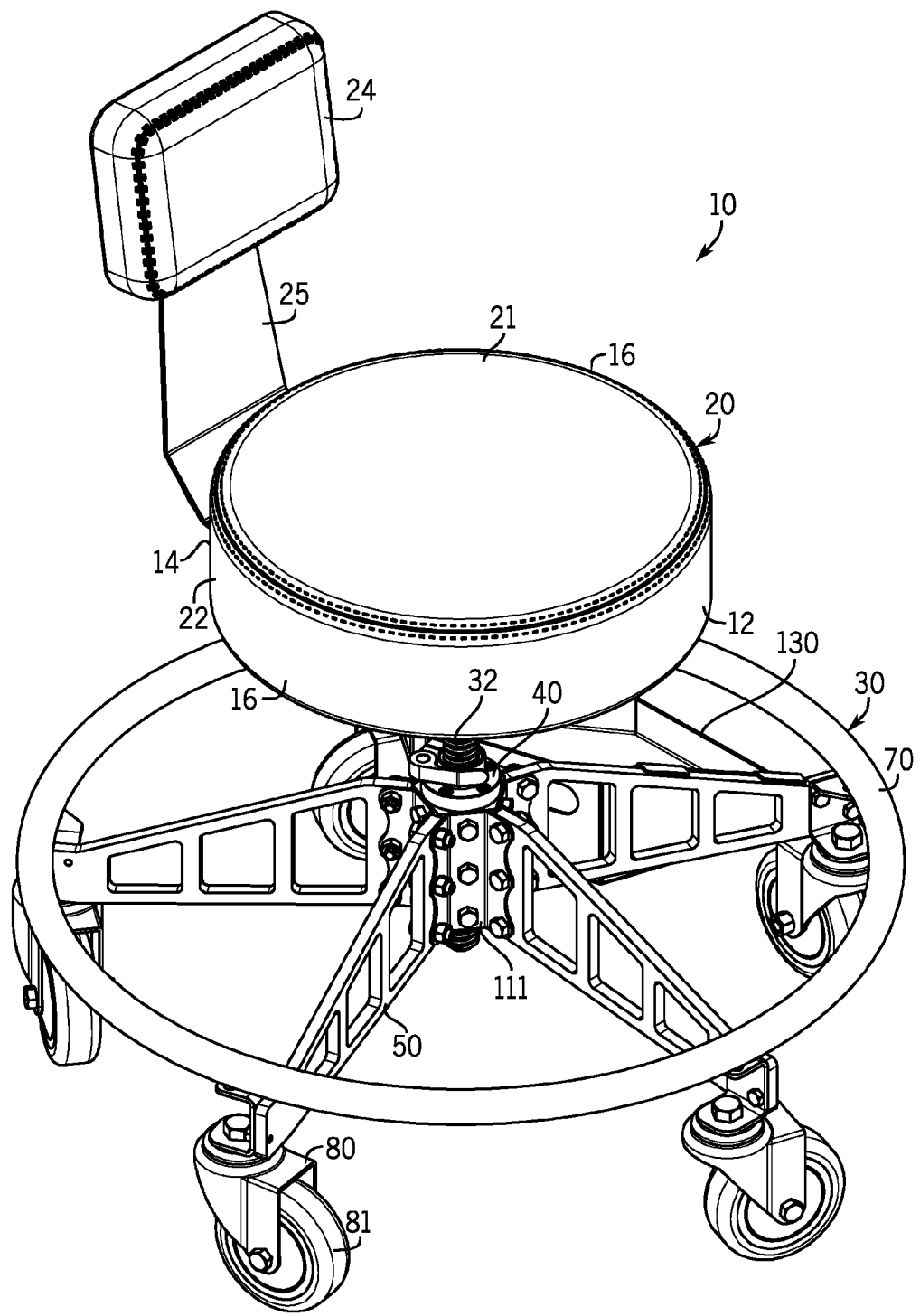
FIG. 9 is a perspective view of a third or aluminum legged embodiment of the shop chair with five truss legs and a tool container positioned between two legs.
Figure 10:
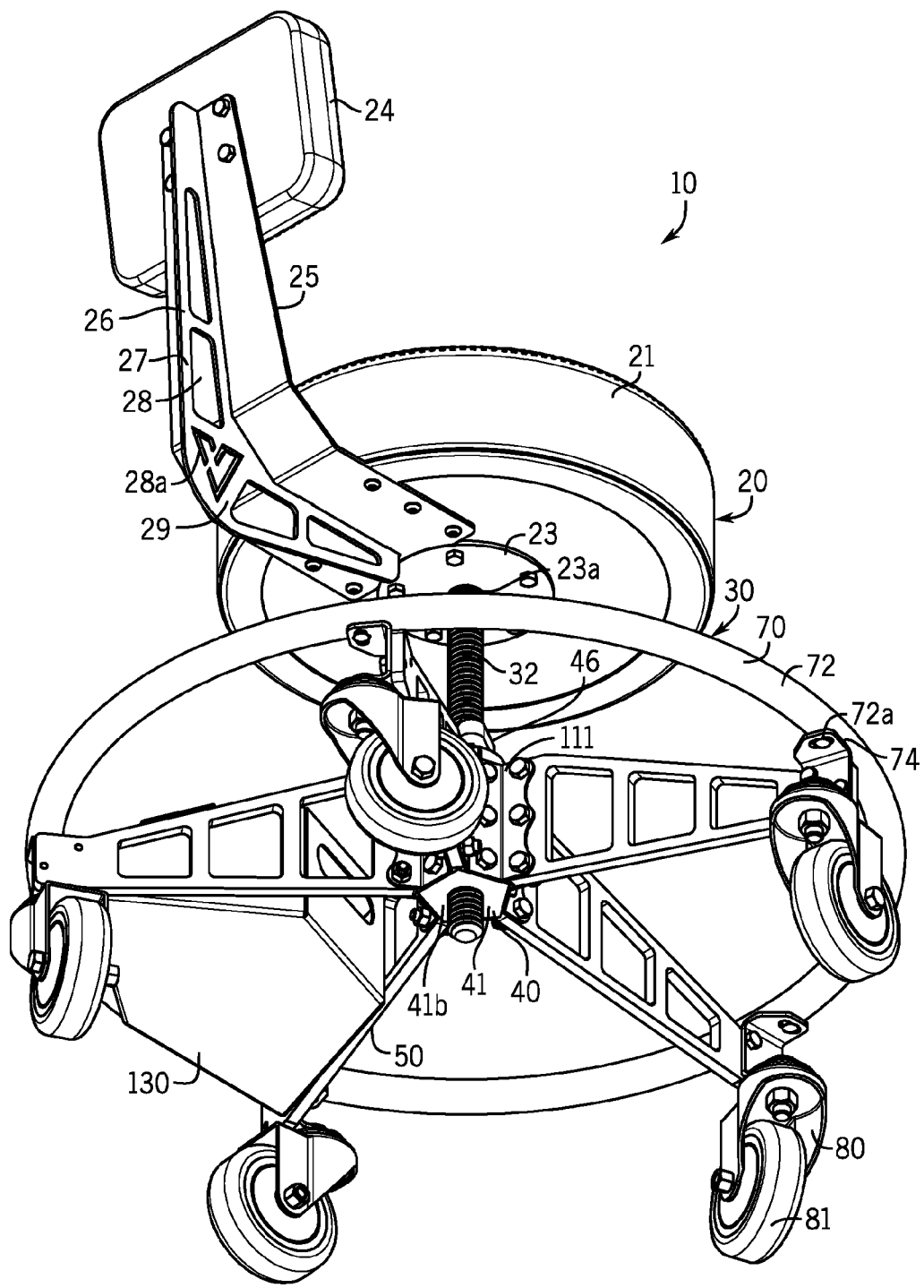
FIG. 10 is a lower perspective view of the third embodiment of the shop chair.
Figure 11:
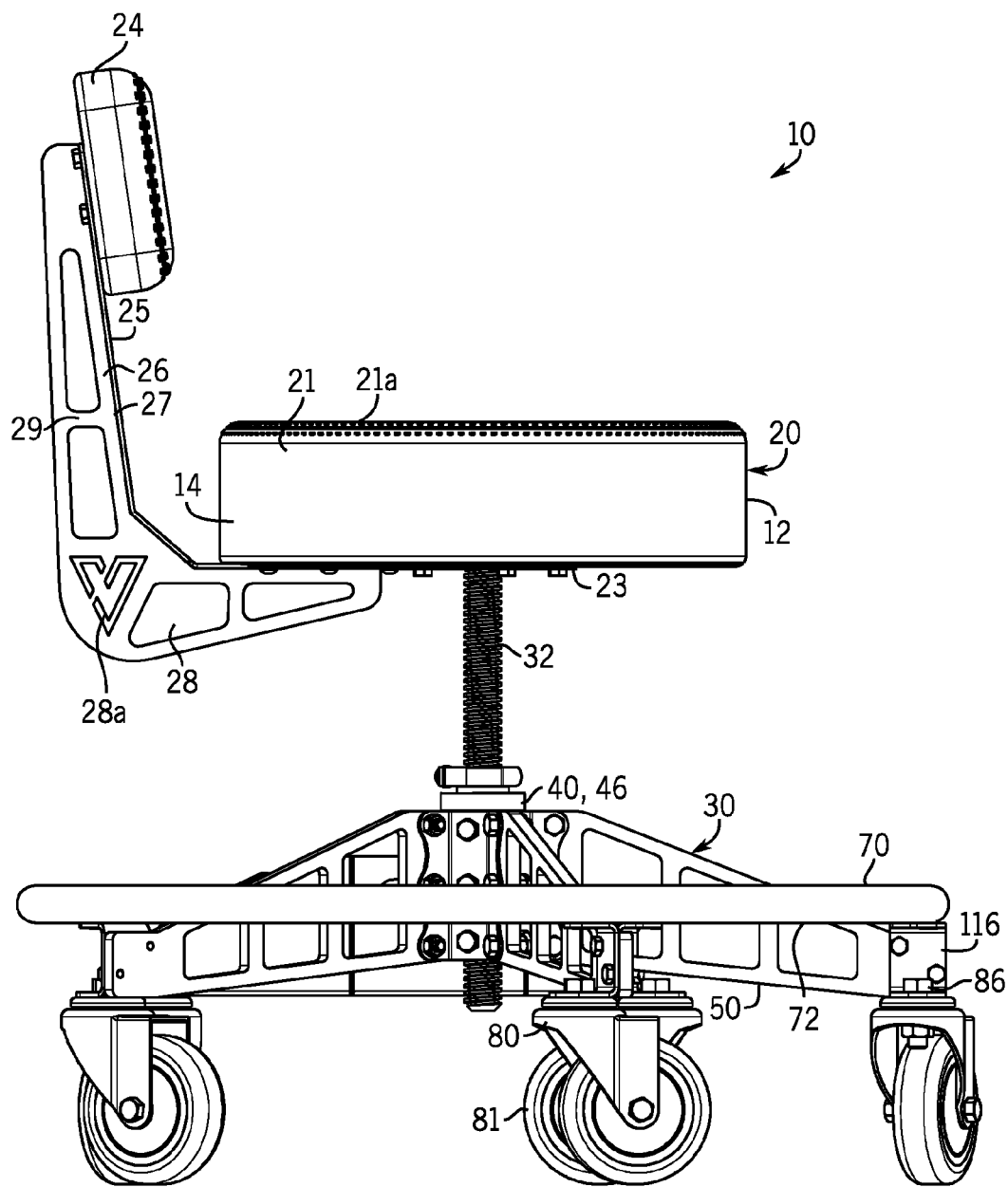
FIG. 11 is a side view of the third embodiment of the shop chair.
Figure 12:
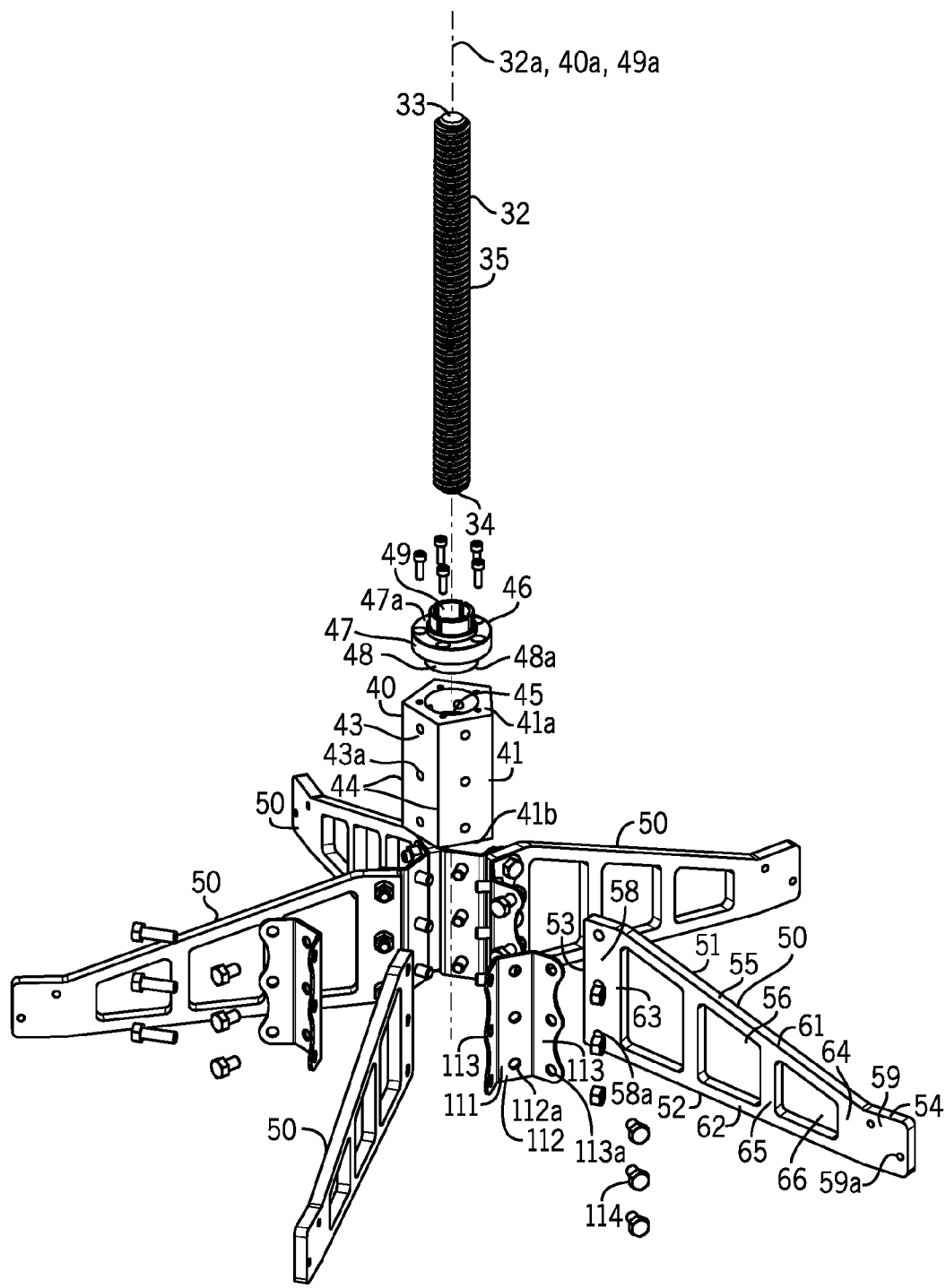
FIG. 12 is an exploded view of the third embodiment of the chair base showing the center column, central hub and screw nut, vertically oriented legs and separate inner brackets for joining the legs to the hub.
Figure 13:
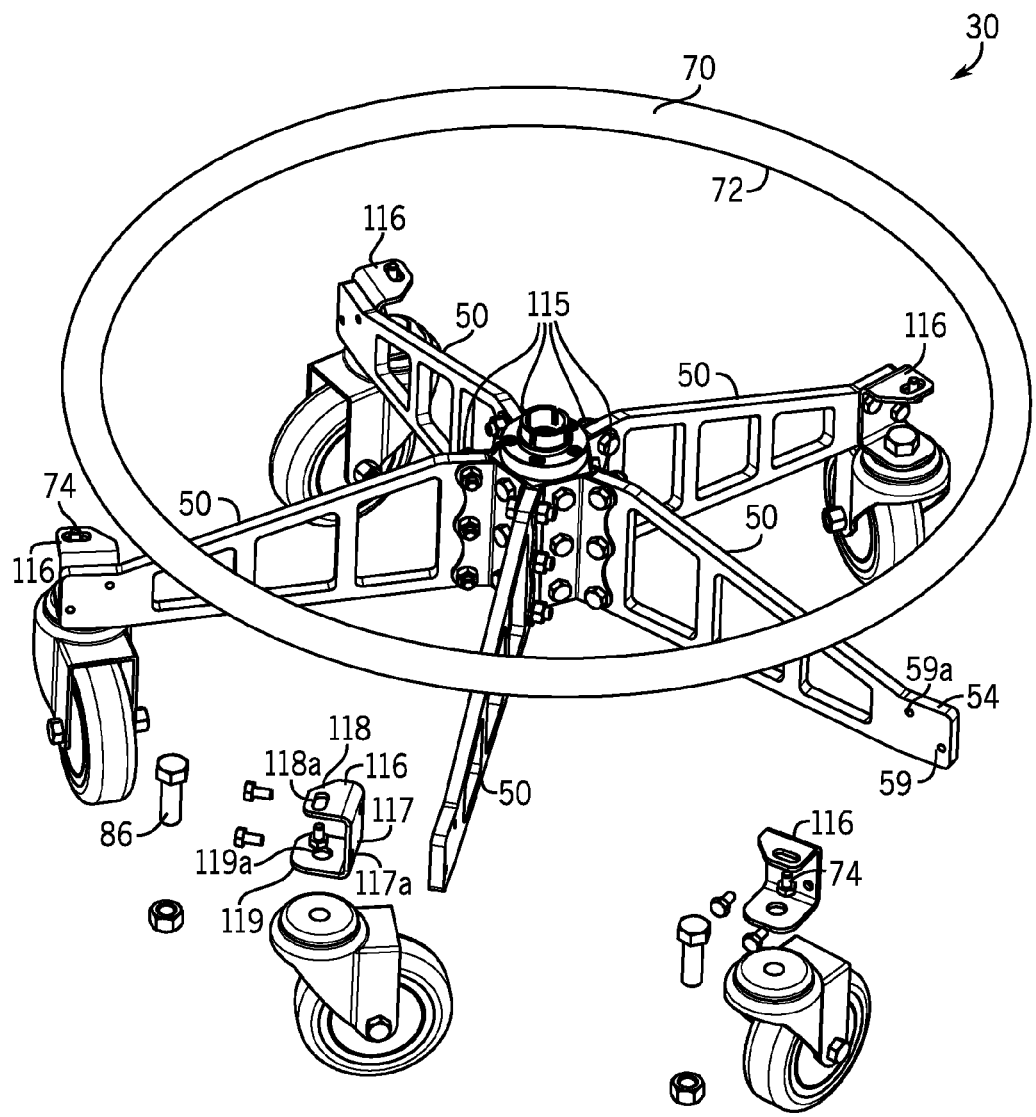
FIG. 13 is a perspective view of the chair base of the third embodiment showing the legs joined to the central hub in an interlocking arrangement, and showing an exploded view of the stabilizing ring, caster wheel assemblies and separate outer brackets for joining the ring and wheel assemblies to the outer ends of the legs.
Figure 14:
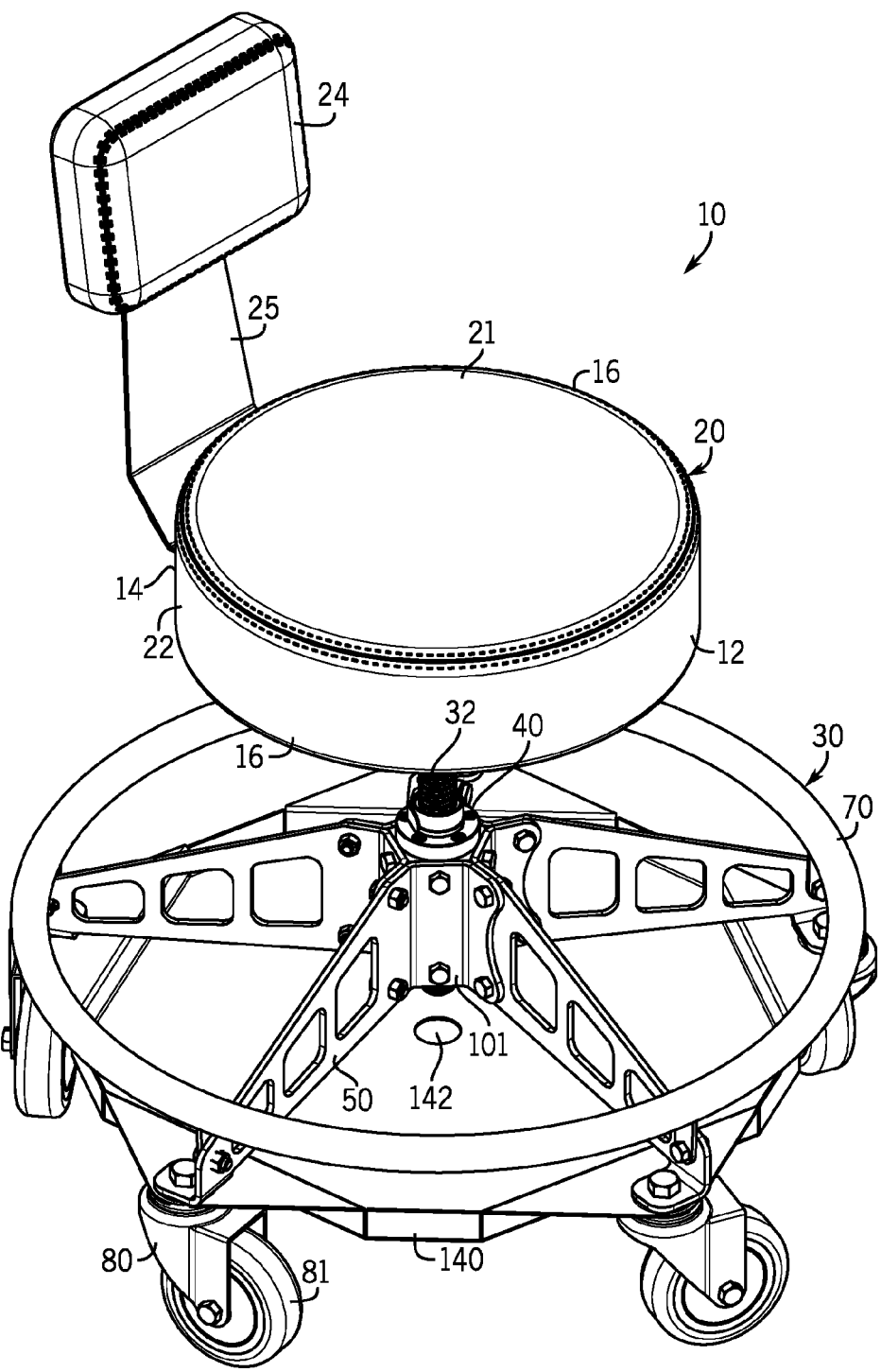
FIG. 14 is a perspective view of a fourth embodiment of the shop chair with five truss legs and a tray positioned below and joined to each of the legs.
Figure 15:
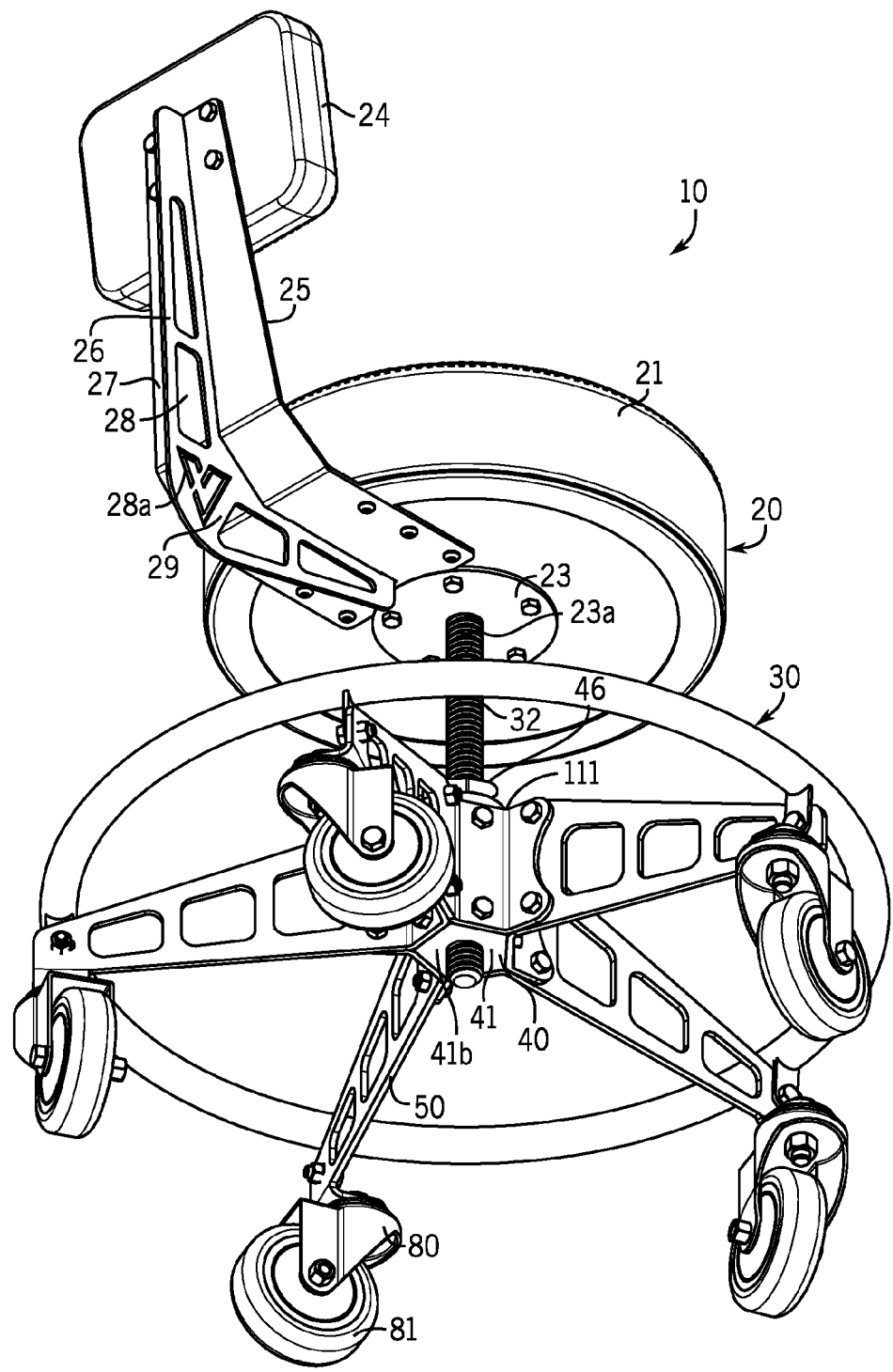
FIG. 15 is a lower perspective view of the fourth embodiment of the shop chair.
Figure 16:
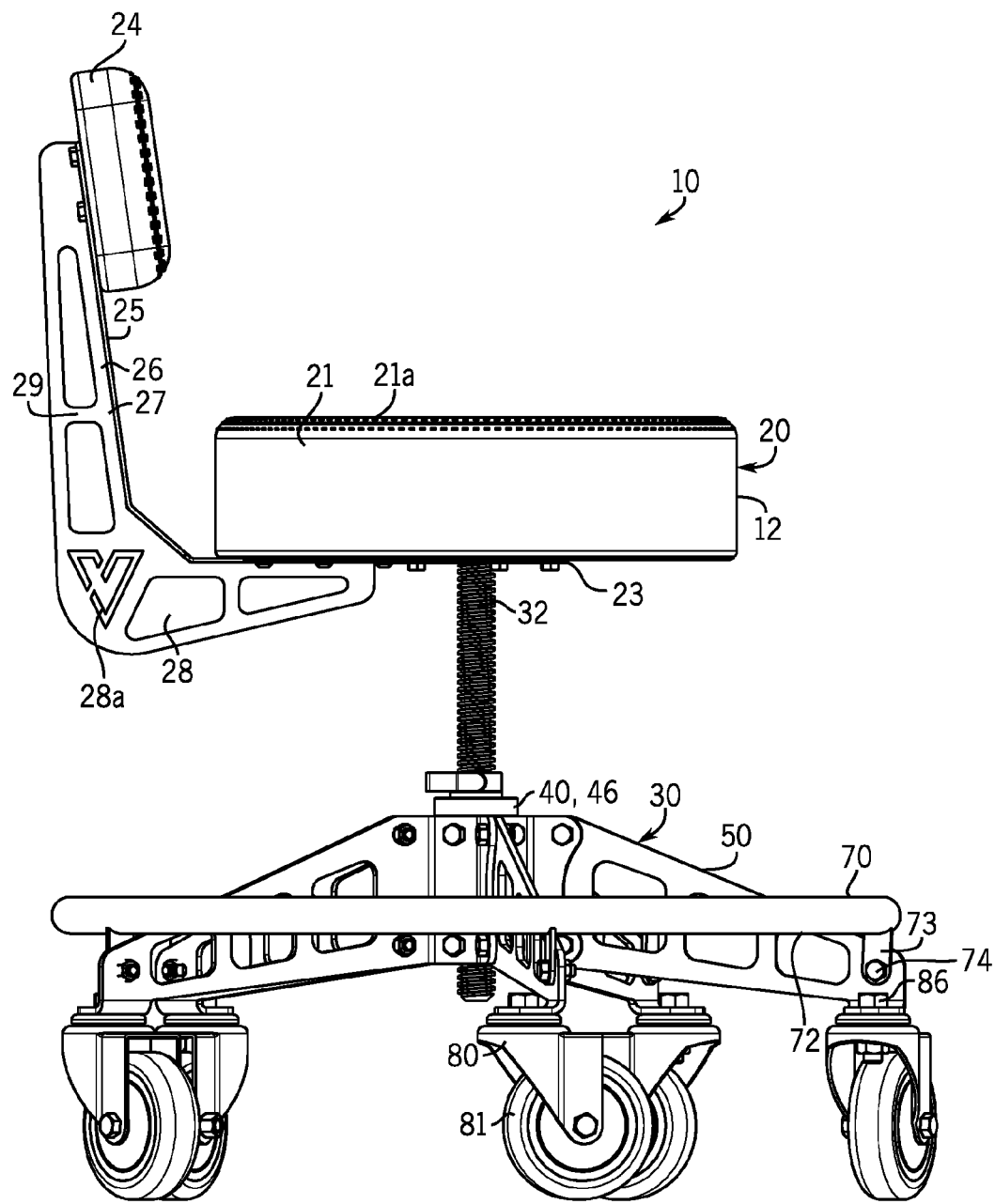
FIG. 16 is a side view of the fourth embodiment of the shop chair.
Figure 17:
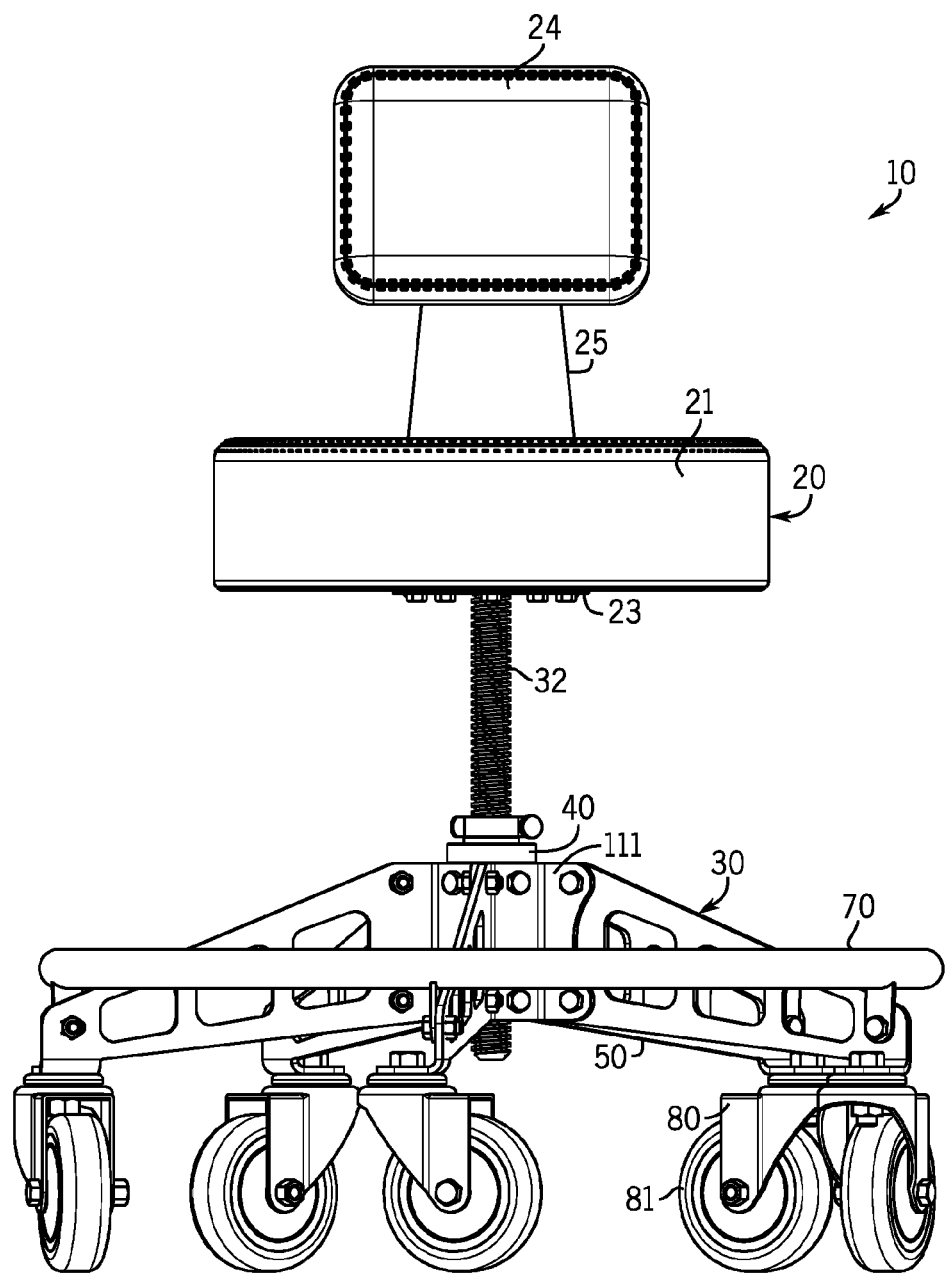
FIG. 17 is a front view of the fourth embodiment of the shop chair.
Figure 18:
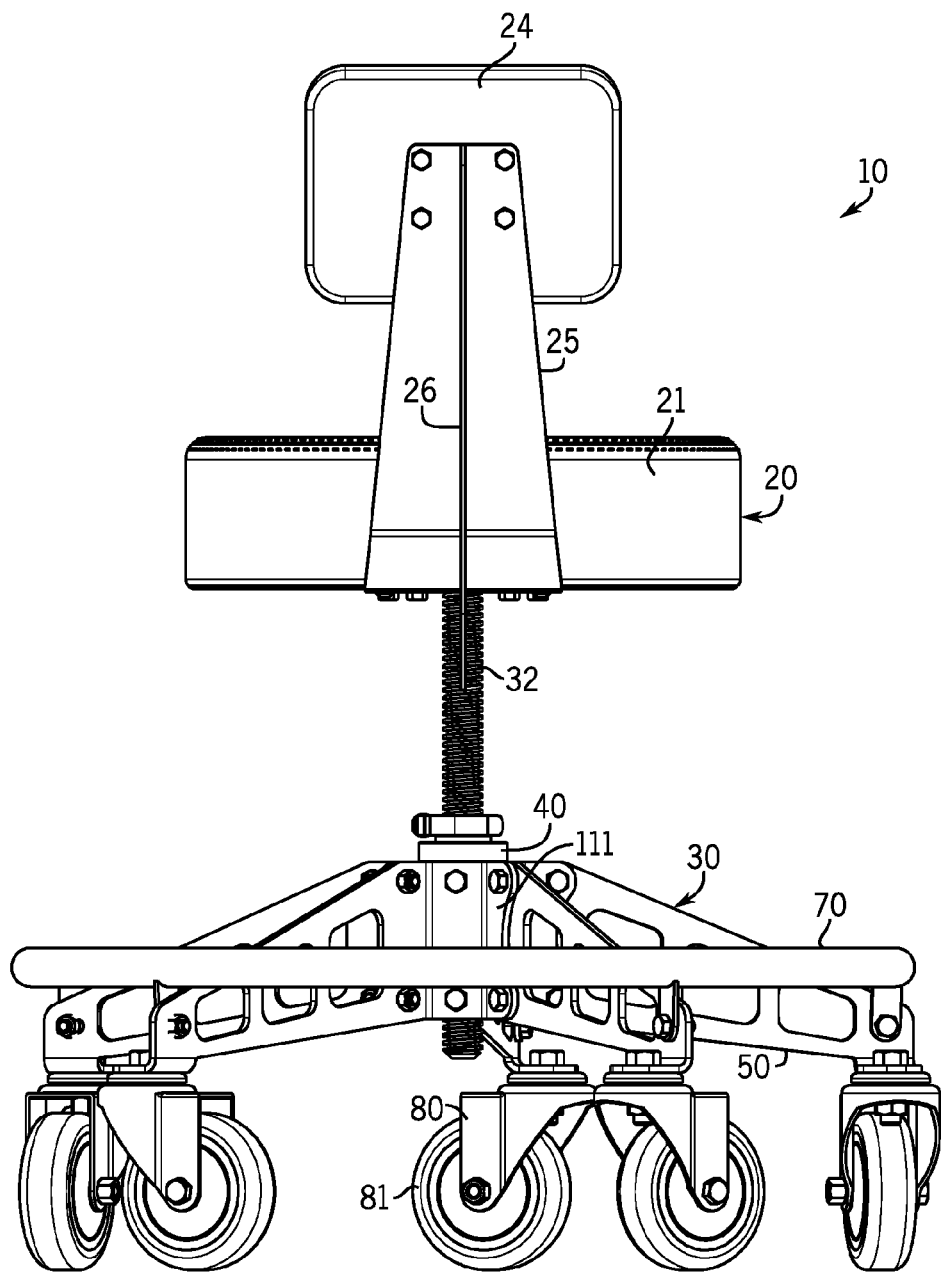
FIG. 18 is a rear view of the fourth embodiment of the shop chair.
Figure 19:
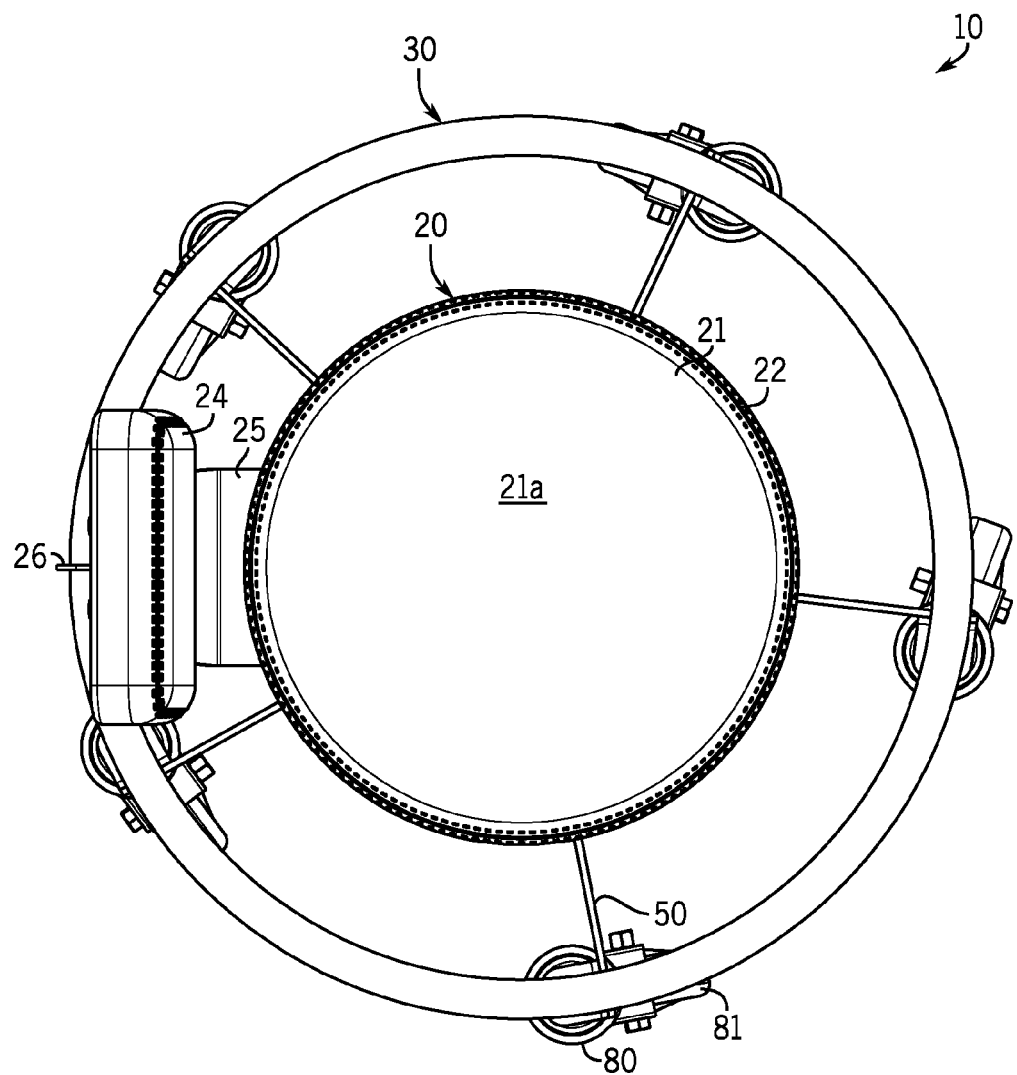
FIG. 19 is a top view of the fourth embodiment of the shop chair.
Figure 20:
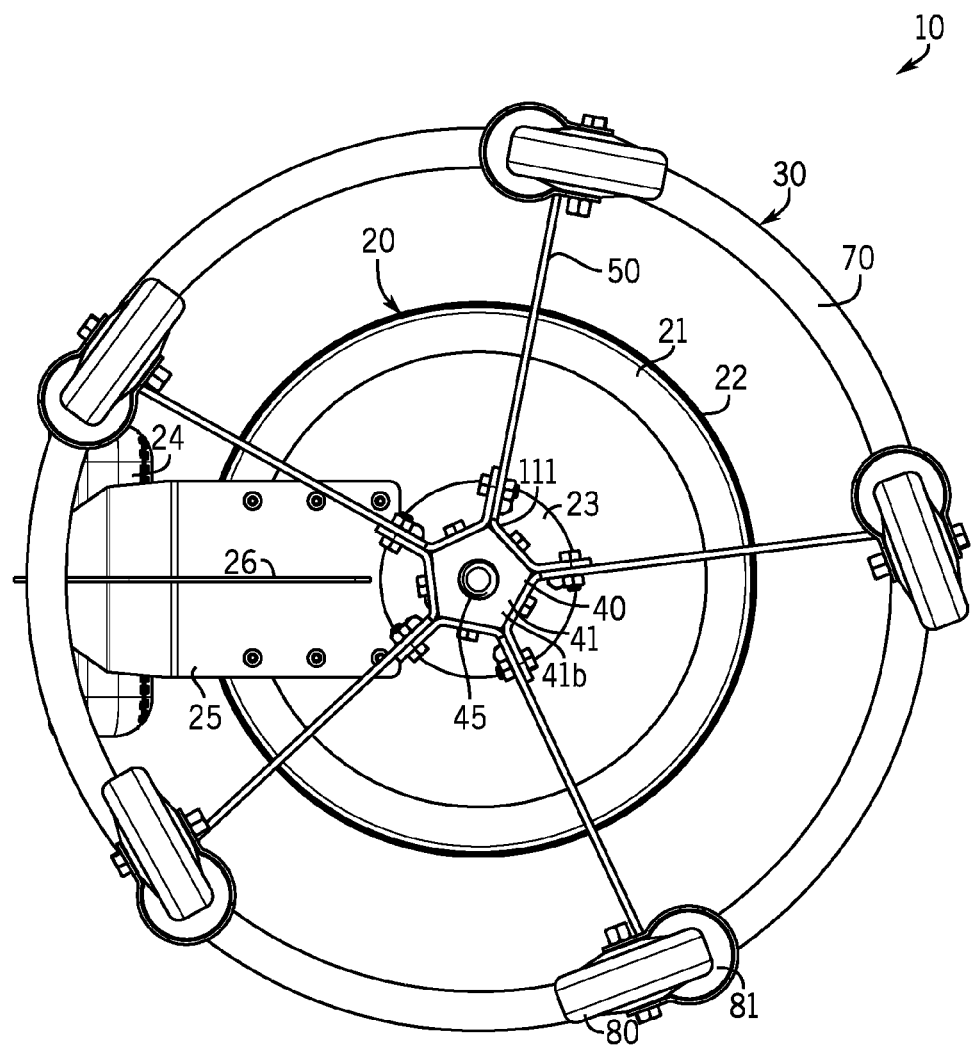
FIG. 20 is a bottom view of the fourth embodiment of the shop chair.
Figure 21:
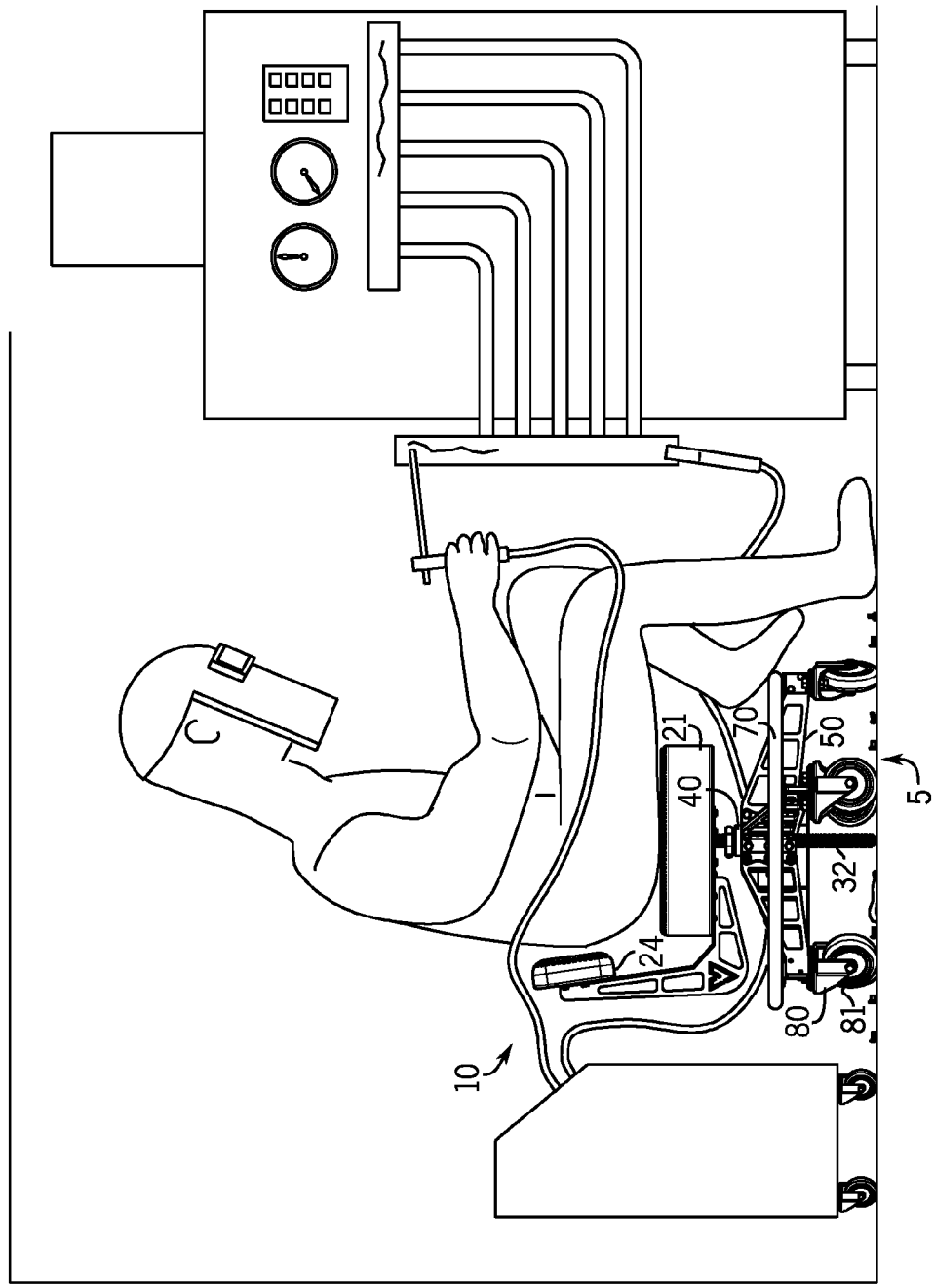
FIG. 21 is a side view showing a person sitting in the fourth embodiment of the chair at its lowest height and welding a piece of equipment resting on the floor.

For the elevated chair 10 embodiment shown in FIGS. 6-8, the upper cord 61 of each leg 50 angles or slopes downward at an angle of about fifty-eight degrees (58°) from horizontal. The lower cord 62 angles or slopes downward at an angle of about fifty-four degrees (54°) from horizontal. The high profile legs 50 are generally similar to the lower profile legs, with a couple distinctions regarding the frame 55 construction. While the upper and lower beams or cords 61 and 62 are downwardly sloped as they extend away from the central hub 40, the downward angle of each upper beam is only slightly greater than the angle of the downward slope of its corresponding lower beam. The beams 61 and 62 are generally parallel. While the inner and outer cross member or cord 63 and 64 join the upper and lower beams 61 and 62, because of the steeper angle of the leg 50, the outer cross member 64 and the intermediate members 65 are generally horizontal. The inner cross member 63 remains vertically oriented to engage the side surface 43 of the hub 40. The horizontally extending outer securement tab 59 extends from both the outer end of the cross member 64 and the lower end of the upper beam 61.

When a person is sitting on the seat 21, the upper cords 61 of the thin plate truss legs 50 are in compression, and the lower cords 62 are in tension. The intermediate cross cords 65 and 66 transmit loads between the upper and lower cords 61 and 62 and keep the upper cords from buckling. Angling the legs 50 elevates the hub 40 from the floor 5. The elevated hub 40 allows more of the central column 32 to pass through it before the column bottom end 34 contacts the floor 5. Contact by the column bottom end 34 with the floor 5 forms a lower stop for the height Sd of the seat cushion 21. Elevating hub 40 allows the seat cushion 21 to be lowered further so that the chair 10 can be used in work spaces where head room is limited. Elevating hub 40 also allows the length of the central column 32 to be increased to gives the seat cushion 21 a greater range of heights Sh, while maintaining a lower seat cushion 21 height.

Figure 3:
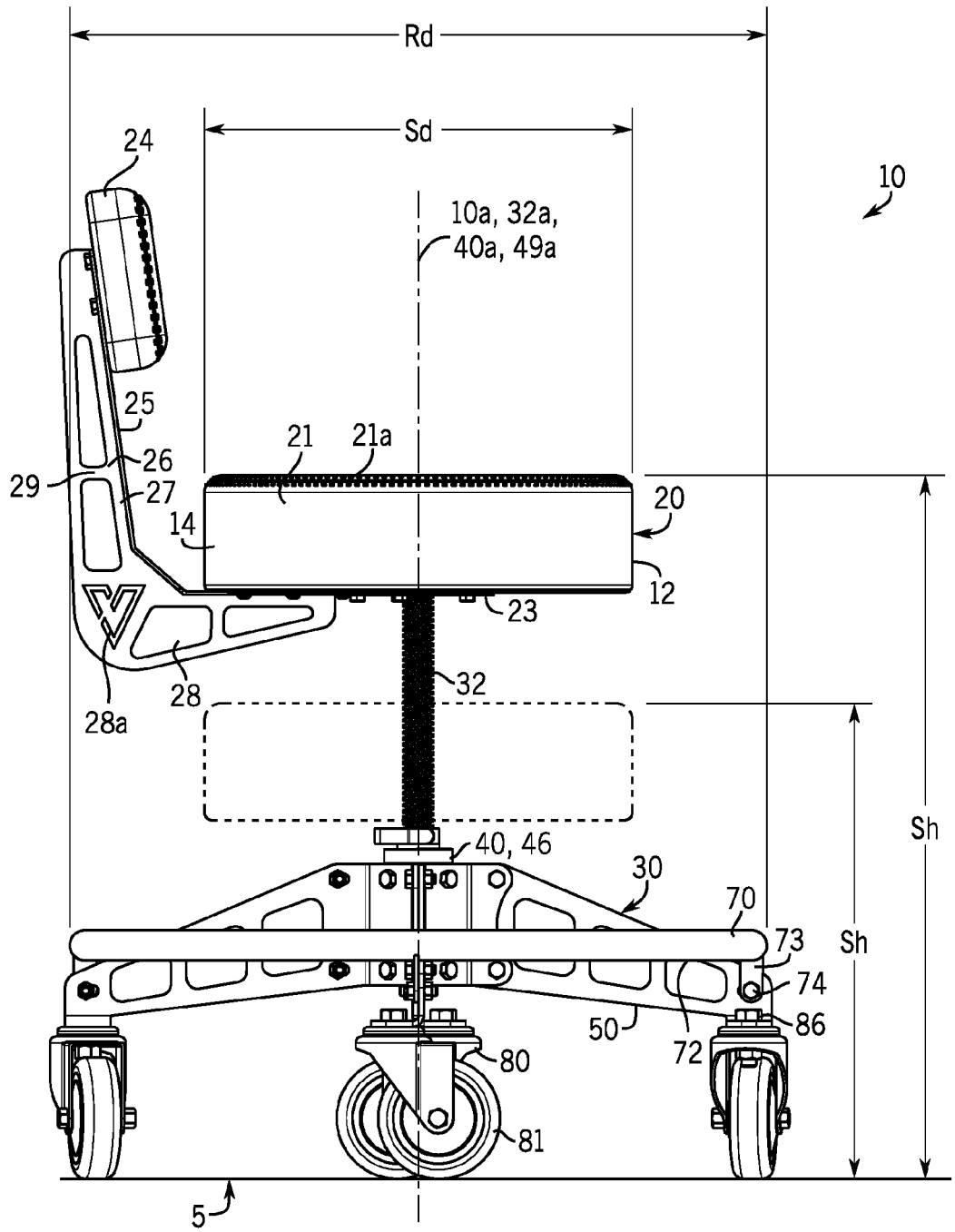
FIG. 3 is a side view of the first embodiment of the shop chair.
Figure 4:
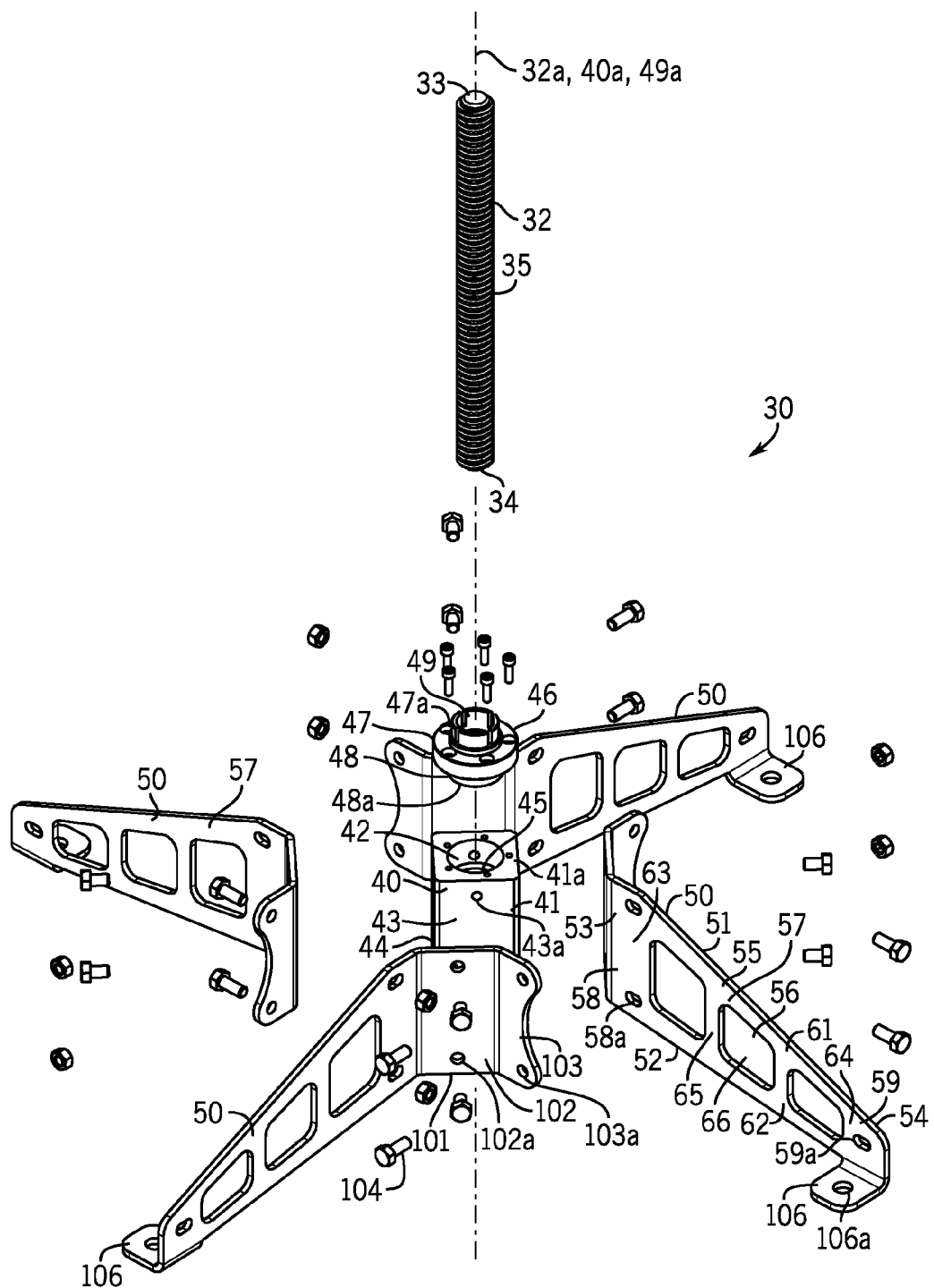
FIG. 4 is an exploded view of the first embodiment of the chair base showing the center column, central hub and screw nut, and vertically oriented legs with integral inner and outer brackets.
Figure 5:
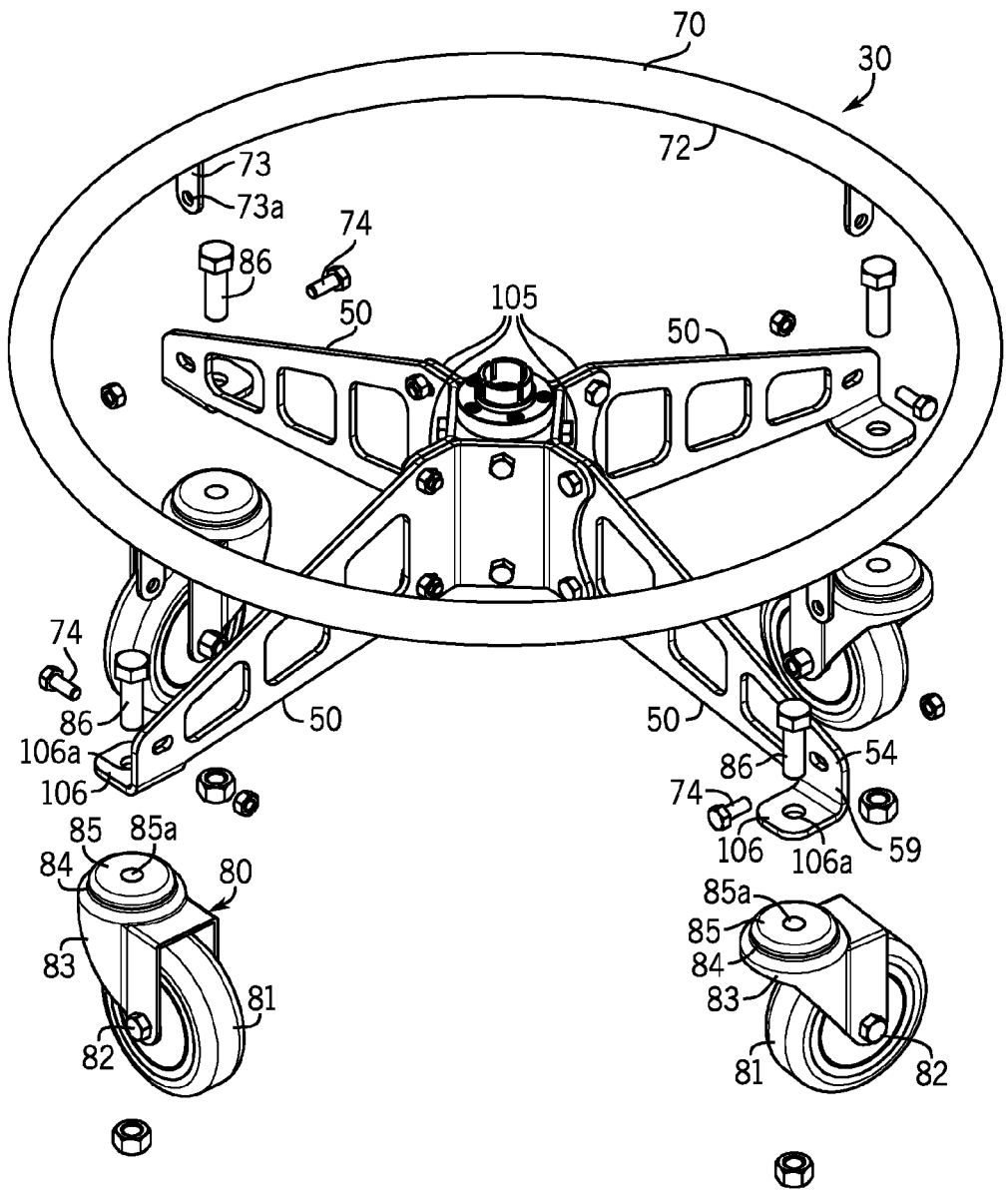
FIG. 5 is a perspective view of the chair base of the first embodiment showing the legs joined to the central hub in an interlocking arrangement, and showing an exploded view of the stabilizing ring and caster wheel assemblies for joining to the outer ends of the legs.

The circular stabilizing ring 70 is rigidly secured to the outer end 54 of each leg 50. The ring 70 is preferably light weight and formed from a cylindrical metal tube bent to form the circular ring with its ends welded, bolted or otherwise rigidly joined together. The tubular ring 70 has a weight of about 4.9 pounds. The stainless steel tube forming the ring 70 has a diameter of about one half to two (½ to 2) inches, and is preferably about one (1) inch. The tubular ring 70 has a wall thickness of about 0.08 inches. The ring 70 diameter Rd is larger than the seat 21 diameter Sd. The ring 70 diameter Rd is at least about thirty percent (30%) larger than the seat 21 diameter Sd to provide sufficient lateral support for the legs 50. For a chair base 30 with a twenty-four (24) inch diameter or footprint and a seat 31 diameter Sd of fourteen (14) inches, the ring 70 diameter Rd is preferably about twenty-three (23) inches, which is about sixty percent (60%) larger than the seat diameter as shown in FIG. 3. The center of the ring 70 is aligned with the chair 10a, column 32a and hub 40a centerline.

The ring diameter Rd is large enough to position the ring 70 over the outer securement tab 59 of each radially extending leg 50. The underside 72 of the ring 70 is bolted or otherwise rigidly secured to each leg 70 at a location proximal the outer end 54 of each leg. The ring is firmly secured via fasteners 74 that engage the outer end 54 of each leg 50 and a hole 72a formed in the lower side 72 of the ring proximal each outer leg end 54 (FIG. 13), or via a downwardly extending tab 73 with a hole 73a proximal each outer leg end 54 as in FIGS. 5, 8 and 16. The central hub 40, radially extending thin plate legs 50 and outer circular ring 70 combine to form a stable and robust base 30 designed to handle the vertical and torsional loads applied to the chair base 30. The horizontally oriented ring 70 extends around the outer perimeter or footprint of the chair base 30. The ring 70 is just above and proximal to the caster wheel assemblies 80, and is preferably about two inches above the top of the caster wheel assemblies 80. The ring 70 acts as a bumper to push larger items or debris away from the caster wheels assemblies 80 or from going under the chair base 30.

Oversized caster wheel assemblies 80 are firmly secured to the outer end 54 of the legs 50. Each caster wheel assembly has a weight of about one (1) pound. Each caster wheel assembly 80 has a wheel 81 with an axle 82 secured to a mounting bracket 83, and a mounting plate 85 secured to the mounting bracket 83 by a pivot bolt or pin 86. The pivot bolt 86 passes through a hole 85a passing through the top surface 84 of the mounting bracket 83 and plate 85. The wheel 81 is free to rotate about its axle 82, and the mounting bracket 83 is free to pivot or turn relative to the mounting plate 85. Bearings are preferably held between the top of the mounting bracket 83 and the mounting plate 85. The mounting plate 85 is firmly secured to the outer securement tab 59 of its corresponding leg 50. The wheels 81 are oversized for conventional chairs. Each wheel 81 has a diameter of about four (4) inches. Each caster wheel assembly 80 has a height from the floor 5 to its mounting plate 85 of about five (5) inches. While the shop chair 10 is shown and described as having caster wheel assemblies 80, it should be understood that the chair is also suitable as a stationary chair by using stationary foot pads (not shown) instead of caster wheel assemblies 80.

The oversized caster wheel assemblies 80 further elevate the hub 40 from the floor 5. In the first, third and fourth embodiments of the chair 10 (FIGS. 1-5, 9-13 and 14-20), the top 47a of the hub 40 is about eleven (11) inches from the floor 5, which as noted above gives the seat cushion 21 a height range between fifteen to twenty-four (15 to 24) inches. In the second elevated embodiment of the chair 10 (FIGS. 6-8), the top 47a of the hub 40 is about nineteen (19) inches from the floor 5, which gives the seat cushion 21 a height range of between twenty-four to thirty-two (24 to 32) inches.

Each leg 50 is rigidly secured to the vertical side surface 43 of the hub 40. In the first, second and fourth embodiments (FIGS. 1-5, 6-8 and 14-20), the legs 50 are formed from a malleable steel, and include integral inner and outer bracket portions 101 and 106 that are bent during manufacturing. The inner bracket portion 101 has first and second bent portions 102 and 103. The first or hub securing portion 102 is machine bent laterally (relative to leg frame 55) to lay flat against one of the flat side surfaces 43 of the hub 40. The leg frame 55 and securement tab 58 extend radially outward from the edge 44 of the surface 43. The second or adjacent leg securing portion 103 is further bent laterally (relative to hub securing portion 102) to lay flat against the side surface 57 of the inner securement tab 58 of an adjacent leg 50.

Holes 102a formed into the hub securing portion 102 align with the holes 43a in the vertical side surface 43 of the hub 40 to rigidly secure the leg 50 to the hub 40 via bolt type fasteners 104. Holes 103a are also formed into the adjacent leg securing portion 103. These holes 103a align with holes 58a in the inner securement tab 58 of an adjacent leg 50 to rigidly secure that leg 50 to its adjacent leg via bolt type fastener 104. The bolts 104 passing through the holes 43a, 58a, 102a and 103a secure each leg 50 to the hub 40 and both of its adjacent legs. When all the legs 50 are securely bolted 104 in place to the hub 40 and their adjacent legs 50, they form an interlocking leg securement mechanism 105 that is secured to and around the central hub 40. While the preferred embodiments show bolts rigidly securing the legs 50 to the hub 40, it should be understood that they can be rigidly secured via welding or other forms of rigid securement without departing from the broad aspects of the invention.

The outer bracket 106 of each leg 50 pivotally secures one caster wheel assembly 80. The outer bracket portion 106 is machine bent laterally to extend horizontally from the outer securement tab 59 and outer cord 64 of the leg 50. The outer bracket portion 106 has a hole 106a aligned over the hole 85a in the top surface 84 of the mounting bracket 83 and plate 85 of the caster wheel assemblies 80. The pivot bolt 86 passes through holes 85a and 106a to pivotally secure the caster wheel assembly to the outer end 54 of the leg 50. The centerline of the pivot bolt 86 linear and holes 85a and 106a form the pivot axis for the cater wheel assembly 80.

In the third chair 10 embodiment (FIGS. 9-13), the legs 50 are made of aluminum.

Because aluminum plates are not readily bent without a loss of strength, the integral inner and outer bracket portions 101 and 106 are replaced by separate inner and outer brackets 111 and 116, respectively. The inner or hub securing bracket 111 has a central plate 112 with holes 112a, and two angled side plates 113 with holes 113a. Each of the central hub securing plates 112 lays flat against one of the flat vertical side surfaces 43 of the hub 40. The holes 112a in the central hub securing plate 112 align with the holes 43a in the vertical side surface 43 of the hub 40 to rigidly secure each bracket 111 to one of the vertical side surfaces 43 of the hub 40 via bolt type fasteners 104. The angled side plates 113 extend outwardly from the edges 44 of the vertical side surface 43. The inner securement tab 58 of each leg 50 is positioned between the angled side plates 113 of two adjacent hub securing brackets 111, so that each leg extends radially outward from one surface edge 44 of the hub 40. The holes 113a in the angled plates 113 align with holes 58a in the inner securement tab 58 of the leg 50 to rigidly secure that leg 50 to the hub 40 via bolt type fastener 104. The bolts 104 passing through the holes 43a, 58a, 112a and 113a rigidly secure each leg 50 to the hub 40 and its adjacent legs. When all the legs 50 of a chair 10 are securely bolted 104 in place, they form a second or alternate interlocking leg securement mechanism 115 that is secured to and around the central hub 40.

The outer bracket 116 has a U-shape with central portion 117 with two holes 117a, and upper and lower portions 118 and 119 with holes 118a and 119a. The central portion 117 is bolted 124 or otherwise rigidly secured to the outer securing tab 59. Two bolts 124 pass through holes 59a and 117a to join the bracket 116 to the leg 50. The caster wheel assembly 80 is firmly secured to the lower portion 118 via pivot pin 86 passing through holes 85a and 118a. The stabilizing ring 70 is pivotally secured to the upper portion 119 via a screw type fastener passing through holes 72a and 119a.

The shop chair 10 is sometimes equipped with additional structures. The second or elevated chair 10 embodiment (FIGS. 6-8) includes a set of metal stiffening ribs 120 to handle the loads placed on the legs 50. Each rib 120 has an arcuate shape and opposed ends. Each rib 120 span between two adjacent legs 50, with the ends of each rib being bolted or otherwise rigidly secured to the outer ends 54 of the adjacent legs. The convex ribs 120 are inwardly bowed between the legs. The third chair 10 embodiment (FIGS. 9-13) has a removable wedge shaped tool tray 130 between two adjacent legs 50. The tray 130 is made of a durable plastic or metal. The sides of the tray 130 are angled so that each side is flush with the side 57 of its corresponding leg 50. The angled sides of the tray 130 have an upper rim with a lip that wraps around the top 51 of its corresponding leg 50 to hold the tray in place. The fourth chair 10 embodiment (FIGS. 14-20) has a lower tray 140 positioned below its five legs 50. The lower tray 140 is made of a durable plastic or metal. The lower tray 140 has a generally pentagon shaped main body with five outwardly projecting tabs. One tab extends from each side of the main body. The outer end of each tab is bolted or otherwise firmly secured to the outer end 54 of each leg 50. The main body of the tray 140 has a central hole 142 to allow the central column 32 to pass through the tray when the seat cushion 21 of the chair 10 is in a lowered position.

While the invention has been described with reference to four preferred embodiments, it will be understood by those skilled in the art that various changes may be made and equivalents may be substituted without departing from the broader aspects of the invention.

I claim:
1. A chair comprising:
a seat having a seat diameter and an adjustable seat height;
a threaded central column secured to and extending down from said seat;
a central hub having a screw nut, a downward extending side surface and a vertical threaded central opening to adjustably receive said central column, said screw nut forming said threaded central opening, said central column being securely received by said central hub to adjustably set said seat at a desired seat height, said seat and central column being rotatable relative to said central hub to adjust said seat height, said central column passing completely through said central hub when said seat is in a lower position;
a plurality of vertically oriented thin plate legs with inner and outer leg ends, said plate legs being uniformly spaced around said side surface of said central hub and extending radially outward from said central hub, each of said plate legs being integrally formed and having a solid frame, an interior with a plurality of openings, and at least one intermediate member, said frame having an inner riser and spaced apart upper and lower beams, said inner riser of each said plate legs being rigidly secured to said side surface of said central hub, each of said upper beams being angled downward from said central hub at an angle greater than said lower beams, said upper and lower beams being closer together proximal said outer leg end and further apart proximal said inner leg end, said upper and lower beams of each said frame being joined together by said at least one intermediate member;

a ring having a ring diameter greater than the seat diameter, said ring being positioned over each of said plate legs and firmly secured to each of said plate legs proximal said outer leg end; and, a plurality of caster wheel assemblies, one of said caster wheel assemblies being rotatably secured to each said plate legs proximal said outer leg end.

2. The chair of claim 1, and wherein each said thin plate leg has a length-to-thickness ratio of at least about 28 to 1.

3. The chair of claim 1, and wherein each of said thin plate legs has a height-to-thickness ratio of at least about 10 to 1 at said inner leg end and at least about 5 to 1 at said outer leg end.

4. The chair of claim 1, and wherein said hub has a diameter of about 3 inches, each of said legs has a thickness of about 3/16 inch, a height at said inner leg end of at least about 3 inches and a length that extends a horizontal distance of at least about 10 inches from said hub, and said stiffening ring has a diameter of at least about 23 inches.

5. The chair of claim 4, and wherein said central hub has an elongated main body with a hub length of at least about 3 inches, and each of said inner risers spans said hub length.

6. The chair of claim 5, and wherein said seat is a seat cushion having a thickness of about 3 inches, and said seat height adjustment range has a lower height position of about 15 inches.

7. The chair of claim 1, and wherein said ring is a tubular ring having a ring diameter at least about 30 percent greater than said seat diameter.

8. A chair comprising:
a seat having a seat diameter and an adjustable seat height;
a threaded central column secured to and extending down from said seat;
a central hub having a downward extending side surface and a vertical threaded central opening to adjustably receive said central column, said central column being securely received by said central hub to adjustably set said seat at a desired seat height, said seat and central column being rotatable relative to said central hub to adjust said seat height, said central column passing completely through said central hub when said seat is in a lower position;
a plurality of vertically oriented thin plate legs with inner and outer leg ends, said plate legs being uniformly spaced around said side surface of said central hub and extending radially outward from said central hub, each of said plate legs being integrally formed and having a solid frame, an interior with a plurality of openings, and at least one intermediate member, said frame having an inner riser and spaced apart upper and lower beams, said inner riser of each said plate legs being rigidly secured to said side surface of said central hub, each of said upper beams being angled downward from said central hub at an angle greater than said lower beams, said upper and lower beams being closer together proximal said outer leg end and further apart proximal said inner leg end, said upper and lower beams of each said frame being joined together by said at least one intermediate member;
a ring having a ring diameter greater than the seat diameter, said ring being positioned over each of said plate legs and firmly secured to each of said plate legs proximal said outer leg end; and,
a plurality of caster wheel assemblies, one of said caster wheel assemblies being rotatably secured to each said plate legs proximal said outer leg end, and wherein said chair is supported by the ground, and said central column engages the ground when said seat is in said lower position.

9. The chair of claim 8, and wherein said seat height has a seat height adjustment range of at least about 9 inches.

10. The chair of claim 1, and wherein each of said caster wheel assemblies is an oversized caster wheel assembly with a wheel having a diameter of at least about 4 inches.

11. The chair of claim 10, and wherein said chair supports a weight of at least about 300 pounds, and said chair has a weight of less than about 38 pounds.

12. The chair of claim 10, and wherein said inner openings between said upper and lower beams of said plate leg form a design, logo or shape of a letter.

13. The chair of claim 1, and wherein said upper beam extends downwardly from said hub at an angle of at least about 20 degrees, and said lower beam extends downwardly from said hub at an angle of at least about 5 degrees.

14. The chair of claim 13, and wherein said upper beam extends downwardly from said hub at an angle of at least about 55 degrees, and said lower beam extends downwardly from said hub at an angle of at least about 50 degrees.

15. The chair of claim 14, and wherein said lower beam is angled downward from said hub, and said upper beam is generally parallel to said lower beam.

16. A chair comprising:
a seat having a seat diameter and an adjustable seat height;
a threaded central column secured to and extending down from said seat;
a central hub having a downward extending side surface and a vertical threaded central opening to adjustably receive said central column, said central column being securely received by said central hub to adjustably set said seat at a desired seat height, said seat and central column being rotatable relative to said central hub to adjust said seat height, said central column passing completely through said central hub when said seat is in a lower position;
a plurality of vertically oriented thin plate legs with inner and outer leg ends, said plate legs being uniformly spaced around said side surface of said central hub and extending radially outward from said central hub, each of said plate legs being integrally formed and having a solid frame, an interior with a plurality of openings, and at least one intermediate member, said frame having an inner riser and spaced apart upper and lower beams, said inner riser of each said plate legs being rigidly secured to said side surface of said central hub, each of said upper beams being angled downward from said central hub at an angle greater than said lower beams, said upper and lower beams being closer together proximal said outer leg end and further apart proximal said inner leg end, said upper and lower beams of each said frame being joined together by said at least one intermediate member;
a ring having a ring diameter greater than the seat diameter, said ring being positioned over each of said plate legs and firmly secured to each of said plate legs proximal said outer leg end; and,
a plurality of caster wheel assemblies, one of said caster wheel assemblies being rotatably secured to each said plate legs proximal said outer leg end, and wherein said vertical side surface of said hub is formed by a plurality of flat vertical side surfaces, each of said inner leg ends has an integral angled inner bracket, and each of said angled inner brackets is rigidly secured to one of said flat vertical side surfaces of said central hub.

17. The chair of claim 16, and wherein each of said legs has an integral inner securing tab and each of said integral angled inner brackets forms first and second angled portions, each of said first angled portions being rigidly secured to one of said flat vertical side surfaces of said central hub, each of said second angled portions being rigidly secured to said integral inner securing tab of an adjacent plate leg, said integral angled inner brackets and said first and second angled portions forming an interlocking leg securement mechanism around said central hub.

18. The chair of claim 17, and wherein said first angled portion of said integral angled inner bracket is bolted to one of said flat vertical side surfaces of said hub, and said second angled portion of said integral angled inner bracket is bolted to said integral inner securement tab of said adjacent leg.

19. A chair comprising:
a seat having a seat diameter and an adjustable seat height;
a threaded central column secured to and extending down from said seat;
a central hub having a downward extending side surface and a vertical threaded central opening to adjustably receive said central column, said central column being securely received by said central hub to adjustably set said seat at a desired seat height, said seat and central column being rotatable relative to said central hub to adjust said seat height, said central column passing completely through said central hub when said seat is in a lower position;
a plurality of vertically oriented thin plate legs with inner and outer leg ends, said plate legs being uniformly spaced around said side surface of said central hub and extending radially outward from said central hub, each of said plate legs being integrally formed and having a solid frame, an interior with a plurality of openings, and at least one intermediate member, said frame having an inner riser and spaced apart upper and lower beams, said inner riser of each said plate legs being rigidly secured to said side surface of said central hub, each of said upper beams being angled downward from said central hub at an angle greater than said lower beams, said upper and lower beams being closer together proximal said outer leg end and further apart proximal said inner leg end, said upper and lower beams of each said frame being joined together by said at least one intermediate member;
a ring having a ring diameter greater than the seat diameter, said ring being positioned over each of said plate legs and firmly secured to each of said plate legs proximal said outer leg end;
a plurality of caster wheel assemblies, one of said caster wheel assemblies being rotatably secured to each said plate legs proximal said outer leg end; and,
a plurality of separately formed inner brackets, each of said plate legs having an integral inner securement tab, and each of said integral inner securement tabs being rigidly secure to said central hub by at least one of said separately formed inner brackets.

20. The chair of claim 19, and wherein each of said separately formed inner brackets is positioned between two adjacent plate legs, each said inner bracket being rigidly secured to said central hub and said inner securement tabs of said adjacent plate legs, said separately formed inner brackets forming an alternate interlocking leg securement mechanism around said central hub.

21. The chair of claim 1, and wherein said plurality of legs is at least four legs.

22. A chair comprising:
a seat having a seat diameter and an adjustable seat height;
a central column secured to and extending down from said seat;
a central hub having a downward extending side surface and a vertical central opening to adjustably receive said central column, said central column being securely received by said central hub to adjustably set said seat at a desired seat height, said central column passing completely through said central hub when said seat is in a lower position;
a plurality of vertically oriented thin plate legs with inner and outer leg ends, said plate legs being uniformly spaced around said side surface of said central hub and extending radially outward from said central hub, each of said plate legs being integrally formed and having a solid frame, an interior with a plurality of openings, and at least one intermediate member, said frame having an inner riser and spaced apart upper and lower beams, said inner riser of each said plate legs being rigidly secured to said side surface of said central hub, each of said upper beams being angled downward from said central hub at an angle greater than said lower beams, said upper and lower beams being closer together proximal said outer leg end and further apart proximal said inner leg end, said upper and lower beams of each said frame being joined together by said at least one intermediate member; and,
a ring having a ring diameter greater than the seat diameter, said ring being positioned over each of said plate legs and firmly secured to each of said plate legs proximal said outer leg end; and,
a seat back and an L-shaped bracket with upper and lower portions, said upper portion being rigidly secured to said seat back and said lower portion being rigidly secured to said seat, said L-shaped bracket having a vertically oriented thin plate stiffening web with a solid outer frame, inner openings and intermediated cross members, at least one of said inner openings forming a design, logo or shape of a letter.

\* \* \* \* \*